(12) United States Patent
Aguilar Amaya et al.

(10) Patent No.: US 10,190,865 B2
(45) Date of Patent: Jan. 29, 2019

(54) VERIFYING END EFFECTOR FLATNESS USING ELECTRICAL CONTINUITY

(71) Applicant: Lam Research Corporation, Fremont, CA (US)

(72) Inventors: Silvia Rocio Aguilar Amaya, San Jose, CA (US); Derek John Witkowicki, Newark, CA (US); Damon Tyrone Genetti, Livermore, CA (US)

(73) Assignee: Lam Research Corporation, Fremont, CA (US)

( * ) Notice: Subject to any disclaimer, the term of this patent is extended or adjusted under 35 U.S.C. 154(b) by 281 days.

(21) Appl. No.: 15/087,899

(22) Filed: Mar. 31, 2016

(65) Prior Publication Data

US 2017/0211922 A1    Jul. 27, 2017

Related U.S. Application Data

(60) Provisional application No. 62/287,854, filed on Jan. 27, 2016.

(51) Int. Cl.
*G01B 7/34* (2006.01)
(52) U.S. Cl.
CPC .................... *G01B 7/345* (2013.01)
(58) Field of Classification Search
CPC ....................................... G01B 7/345
USPC ........................................................... 33/533
See application file for complete search history.

(56) References Cited

U.S. PATENT DOCUMENTS

| | | | |
|---|---|---|---|
| 7,084,466 B1* | 8/2006 | Lee ................... | H01L 21/67288 257/414 |
| 2013/0057008 A1* | 3/2013 | Takemura ............ | B25J 9/0012 294/213 |
| 2015/0290815 A1* | 10/2015 | Pergande ............ | B25J 15/0014 294/213 |
| 2017/0053819 A1* | 2/2017 | Richardson ....... | H01L 21/67259 |
| 2017/0211922 A1* | 7/2017 | Aguilar Amaya ..... | G01B 7/345 |

FOREIGN PATENT DOCUMENTS

| CN | 102252605 A | 11/2011 |
|---|---|---|
| CN | 104748643 A | 7/2015 |

OTHER PUBLICATIONS

Chinese First Office Action, issued in Chinese Patent Application No. 201710060670.6 dated Nov. 30, 2018.

* cited by examiner

*Primary Examiner* — Yaritza Guadalupe
(74) *Attorney, Agent, or Firm* — Weaver Austin Villeneuve & Sampson LLP

(57) ABSTRACT

Methods, kits, systems, and apparatuses, for measuring and/or verifying end effector flatness using electrical continuity are provided.

18 Claims, 26 Drawing Sheets

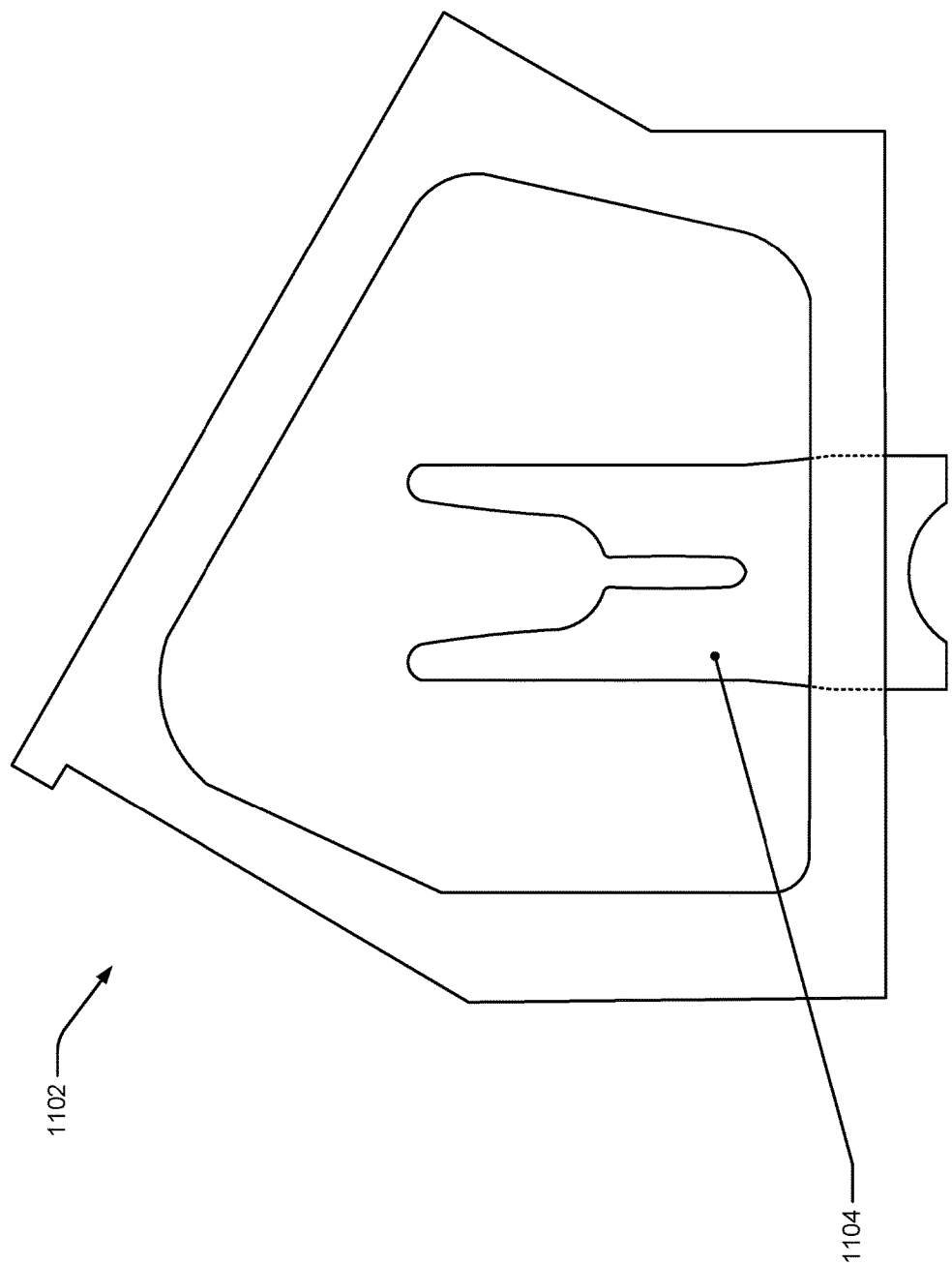

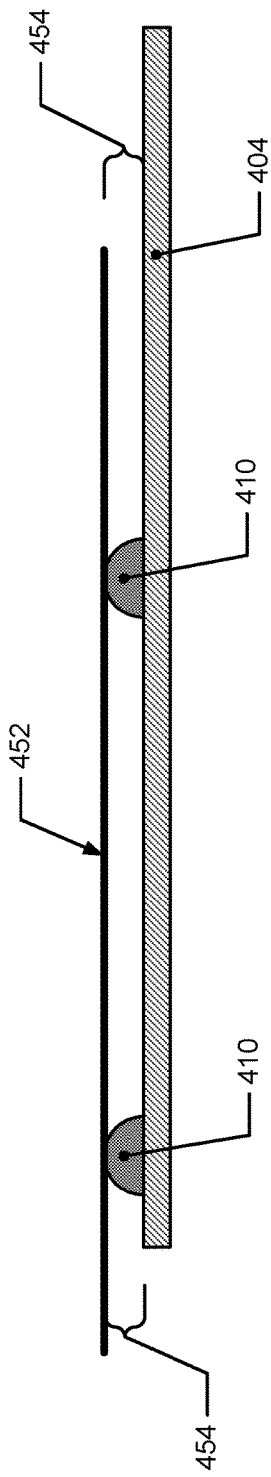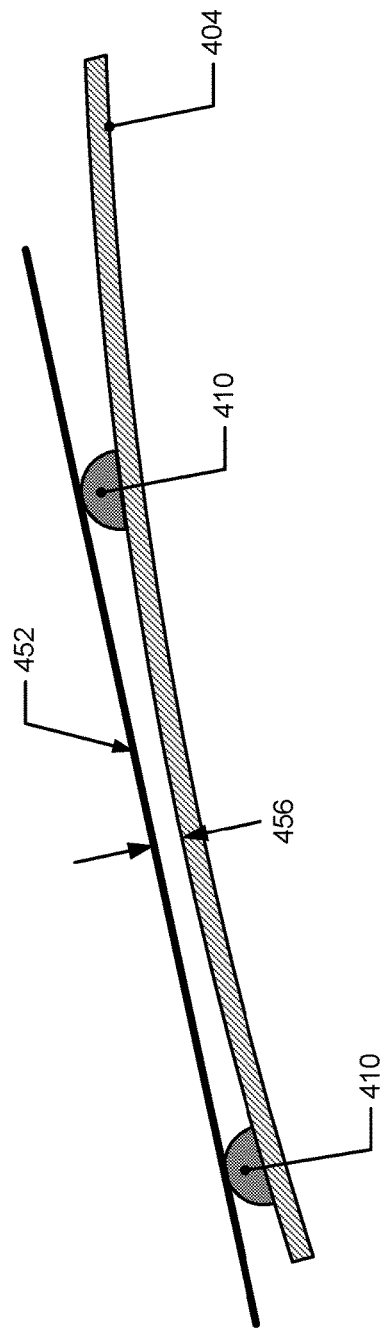

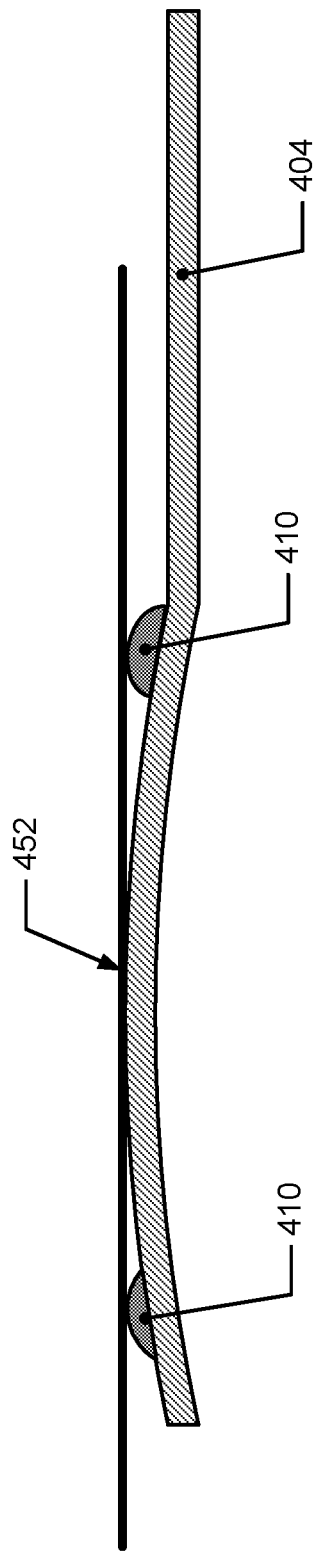

US 10,190,865 B2

VERIFYING END EFFECTOR FLATNESS USING ELECTRICAL CONTINUITY

CROSS REFERENCE TO RELATED APPLICATIONS

This application claims benefit of U.S. Provisional Patent Application No. 62/287,854, filed Jan. 27, 2016, and titled "VERIFYING END EFFECTOR FLATNESS USING ELECTRICAL CONTINUITY," which is incorporated by reference herein in its entirety and for all purposes.

BACKGROUND

Some semiconductor processing tools use robots equipped with end effectors for moving wafers or substrates into, within, and out of the tools. Some such end effectors may take the form of "blade"-type end effectors, which are long, thin, spatula-like structures that may be slipped underneath a wafer and that typically have 3 or more raised contact points on which the wafer rests.

BRIEF DESCRIPTION OF THE DRAWINGS

FIG. 3 depicts a plan view of the example air lock and end effector of FIG. 2.

FIG. 4 depicts a cross-sectional view of an example end effector supporting a wafer.

FIG. 5 depicts a cross section view of the end effector of FIG. 4 in a deflected state.

FIG. 6 depicts an example bent end effector.

Figure 1:
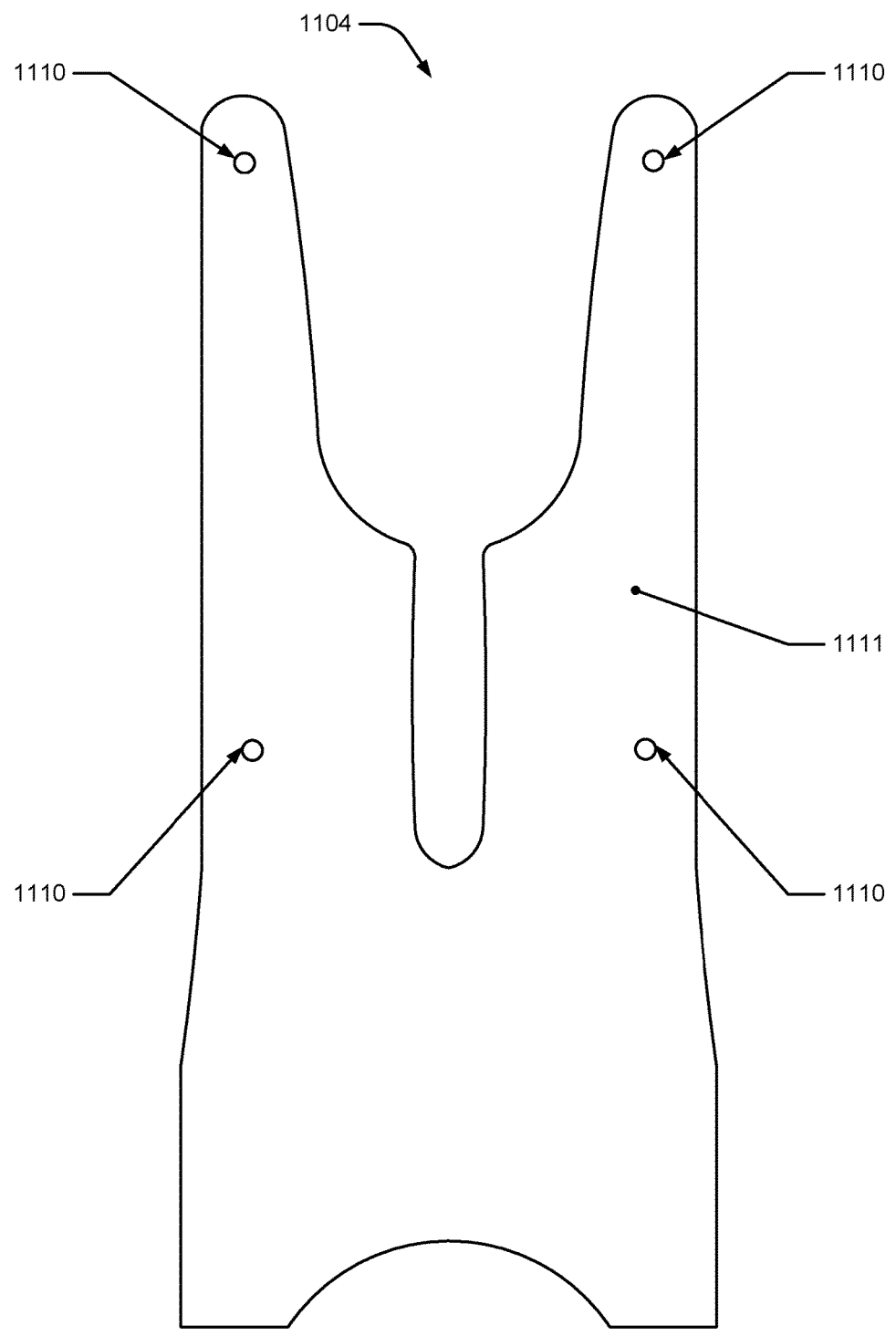
FIG. 1 depicts a plan view of an example end effector.

Flowchart 28 depicts an example technique for using plates such as those in the Figures above to determine flatness of an end effector.

SUMMARY

In one embodiment, a method for measuring flatness of an end effector in a semiconductor processing tool is provided. The method may include moving an end effector downwards in a z-direction to create electrically conductive contact between a first measuring point of the end effector and a probe, such that the z-direction is in the vertical direction, such that the probe is located at a first location, and such that the probe and the first measuring point are configured to create an electrically conductive path when they are in contact; determining when the probe and the first measuring point have formed electrical continuity; and storing a first z-position of the end effector, such that the first z-position of the end effector is a position of the end effector in the z-direction when electrical continuity first occurs between the first measuring point and the probe during the movement of the end effector in the z-direction. The method may also include moving the end effector downwards in the z-direction to create electrically conductive contact between a second measuring point of the end effector and the probe, such that the probe is located at a second location different from the first location, and such that the probe and the second measuring point are configured to create an electrically conductive path when they are in contact; determining when the probe and the second measuring point have formed electrical continuity; and storing a second z-position of the end effector, such that the second z-position of the end effector is a position of the end effector in the z-direction when electrical continuity first occurs between the second measuring point and the probe during the movement of the end effector in the z-direction. The method may further include moving the end effector downwards in the z-direction to create electrically conductive contact between a third measuring point of the end effector and the probe, such that the probe is located at a third location different from the first location and the second location, and such that the probe and the third measuring point are configured to create an electrically conductive path when they are in contact; determining when the probe and the third measuring point have formed electrical continuity; and storing a third z-position of the end effector, such that the third z-position of the end effector is a position of the end effector in the z-direction when electrical continuity first occurs between the third measuring point and the probe during the movement of the end effector in the z-direction.

In some embodiments, the method may further include placing a jig in the semiconductor processing tool, such that the jig is configured to position the probe at the first location, the second location, and the third location.

In some embodiments, the method may further include positioning the probe at the first location, positioning the probe at the second location, and positioning the probe at the third location.

In some embodiments, a jig in the semiconductor processing tool may be configured to position the probe at the first location, the second location, and the third location.

In some embodiments, the end effector may have a non-conductive coating and conductive contact points at the first measuring point, the second measuring point, and the third measuring point.

In some embodiments, the gauge may have a non-conductive base.

In some embodiments, the first measuring point may be located substantially proximate to a first wafer support pad of the end effector, the second measuring point may be located substantially proximate to a second wafer support pad of the end effector, and the third measuring point may be located substantially proximate to a third wafer support pad of the end effector.

In one embodiment, a method for measuring flatness of an end effector in a semiconductor processing tool may be provided. The method may include moving an end effector downwards in a z-direction to create electrically conductive contact between a first measuring point of the end effector and a probe, such that the z-direction is in the vertical direction, wherein the end effector is located at a first location, and such that the probe and the first measuring point are configured to create an electrically conductive path when they are in contact; determining when the probe and the first measuring point have formed electrical continuity; and storing a first z-position of the end effector, such that the first z-position of the end effector is a position of the end effector in the z-direction when electrical continuity first occurs between the first measuring point and the probe during the movement of the end effector in the z-direction. The method may also include moving the end effector from the first location to the second location in one or more of the following: an x-direction and a y-direction, such that the x-direction is orthogonal to the y-direction, and wherein the x-direction and the y-direction are perpendicular to the z-direction; moving the end effector downwards in the z-direction to create electrically conductive contact between a second measuring point of the end effector and the probe, such that the end effector is located at a second location different from the first location, and such that the probe and the second measuring point are configured to create an electrically conductive path when they are in contact; determining when the probe and the second measuring point have formed electrical continuity; and storing a second z-position of the end effector, such that the second z-position of the end effector is a position of the end effector in the z-direction when electrical continuity first occurs between the second measuring point and the probe during the movement of the end effector in the z-direction. The method may also include moving the end effector from the second location to the third location in one or more of the following: an x-direction and a y-direction; moving the end effector downwards in the z-direction to create electrically conductive contact between a third measuring point of the end effector and the probe, such that the end effector is located at a third location different from the first location and the second location, and such that the probe and the third measuring point are configured to create an electrically conductive path when they are in contact; determining when the probe and the third measuring point have formed electrical continuity; and storing a third z-position of the end effector, such that the third z-position of the end effector is a position of the end effector in the z-direction when electrical continuity first occurs between the third measuring point and the probe during the movement of the end effector in the z-direction.

In one embodiment, a kit for measuring flatness of an end effector in a semiconductor processing tool may be provided. The kit may include a first electrical cable, a second electrical cable, a probe, a jig configured to position the probe at at least a first location, a second location, and a third location, and an electrical continuity detector. The first cable may be configured to be electrically connected to the probe, the second cable may be configured to be electrically connected to a ground, the jig may be configured to be placed in a portion of the semiconductor processing tool where the end effector can be located, the electrical continuity detector may be configured to electrically connect with the first electrical cable and the second electrical cable, and the electrical continuity detector may be configured to detect electrical continuity between the probe and the end effector when the probe and the end effector are in electrically conductive contact.

In one such embodiment, the jig may be further configured to position the probe at one or more additional locations.

In further such embodiments, the jig may be further configured to position the probe at a fourth location, a fifth location, a sixth location, a seventh location, and an eighth location.

In one further such embodiment, the jig may be further configured to position the probe at a ninth location and a tenth location.

In some embodiments, the electrical continuity detector may be a multimeter.

In some embodiments, a controller of the semiconductor processing tool may be configured to act as the electrical continuity detector.

In some embodiments, the electrical continuity detector may be a sensor that is electrically connected to an input/output port of a controller of the semiconductor processing tool.

In one embodiment, a system for measuring flatness of an end effector in a semiconductor processing tool may be provided. The system may include an end effector that is at least partially electrically conductive and is configured to move in a z-direction, an x-direction, and a y-direction, wherein the z-direction is in the vertical direction, the x-direction is orthogonal to the y-direction, and the x-direction and the y-direction are perpendicular to the z-direction; a probe; an electrical continuity detector; and a controller which may be configured to: move the end effector in the z-direction to create electrically conductive contact between the end effector and the probe, determine when the probe and the end effector have formed electrical continuity, and store a z-position of the end effector, such that the second z-position of the end effector is a position of the end effector in the z-direction when electrical continuity first occurs between the end effector and the probe during the movement of the end effector in the z-direction.

In one such embodiment, the probe may be configured to be located at a first location, a second location, and a third location in the semiconductor processing tool, and the controller may be further configured to: move the end effector downwards in a z-direction to create electrically conductive contact between the end effector and the probe when the probe is located at the first location, the second location, and the third location, determine when the probe and the end effector have formed electrical continuity when the probe is located at the first location, the second location, and the third location, store a first z-position of the end effector, such that the first z-position of the end effector is a position of the end effector in the z-direction when electrical continuity first occurs between the first measuring point and the probe during the movement of the end effector in the z-direction, store a second z-position of the end effector, such that the second z-position of the end effector is a position of the end effector in the z-direction when electrical continuity first occurs between the second measuring point and the probe during the movement of the end effector in the z-direction, and store a third z-position of the end effector, such that the third z-position of the end effector is a position of the end effector in the z-direction when electrical continuity first occurs between the third measuring point and the probe during the movement of the end effector in the z-direction.

In further such embodiments, the system further includes a jig, such that the jig may be configured to be placed in a portion of the semiconductor processing tool in which an end effector can be located and is configured to position the gauge at a first location, a second location, and a third location.

In some embodiments, the end effector may be further configured to move in an x-direction and a y-direction, such that the x-direction is orthogonal to the y-direction, and such that the x-direction and the y-direction are perpendicular to the z-direction, and the controller is further configured to: move the end effector to a first position, a second position, and a third location, move the end effector downwards in the z-direction to create electrically conductive contact between the end effector and the probe when the end effector is located at the first location, the second location, and the third location, determine when the probe and the end effector have formed electrical continuity when the end effector is located at the first location, the second location, and the third location, store a first z-position of the end effector, such that the first z-position of the end effector is a position of the end effector in the z-direction when electrical continuity first occurs between the first measuring point and the probe during the movement of the end effector in the z-direction, store a second z-position of the end effector, such that the second z-position of the end effector is a position of the end effector in the z-direction when electrical continuity first occurs between the second measuring point and the probe during the movement of the end effector in the z-direction, and store a third z-position of the end effector, such that the third z-position of the end effector is a position of the end effector in the z-direction when electrical continuity first occurs between the third measuring point and the probe during the movement of the end effector in the z-direction.

In one embodiment, a plate may be provided. The plate may include a first conductive surface in which the plate is configured to be placed on an end effector, the first conductive surface is configured to face and overlap with a top surface of an end effector when the plate is placed on the end effector, the first conductive surface is configured to be electrically connected to an electrical continuity detector, the first conductive surface is configured to complete an electrically conductive path when the first conductive surface and the top surface of the end effector are in contact, and the first conductive surface is configured to be separated from the top surface of the end effector by a first distance when the end effector is in an undeflected state.

In some embodiments, the first surface may be offset from a first plate surface by a separation distance.

In some embodiments, the plate may be configurable to have a weight and a center of gravity substantially equal to a weight and a center of gravity of a wafer.

In some embodiments, the plate may have a weight and a center of gravity substantially equal to a weight and a center of gravity of a wafer.

In some embodiments, the plate may be configured to be moved by an end effector.

In some embodiments, the plate may further include a second conductive surface, in which the second conductive surface is configured to face and overlap with the top surface of an end effector when the plate is placed on the end effector, the second conductive surface is configured to be electrically connected to an electrical continuity detector, the second conductive surface is configured to complete an electrically conductive path when the second conductive surface and the top surface of the end effector are in contact, and the second conductive surface is configured to be separated from the top surface of the end effector by a first distance when the end effector is in an undeflected state.

In one embodiment, a kit for determining flatness of an end effector in a semiconductor processing tool may be provided. The kit may include a first electrical cable, a second electrical cable, a plate that plate includes a first conductive surface that is configured to face and overlap with a top surface of the end effector when the plate is placed on the end effector, and an electrical continuity detector. The first cable may be configured to be electrically connected to the first conductive surface, the second cable may be configured to be electrically connected to a ground, the electrical continuity detector may be configured to electrically connect with the first electrical cable and the second electrical cable, and the electrical continuity detector may be configured to detect electrical continuity between the first conductive surface and the top surface of the end effector when the first conductive surface and the top surface of the end effector are in electrically conductive contact.

Description

In the following description, numerous specific details are set forth in order to provide a thorough understanding of the presented concepts. The presented concepts may be practiced without some or all of these specific details. In other instances, well known process operations have not been described in detail so as to not unnecessarily obscure the described concepts. While some concepts will be described in conjunction with the specific embodiments, it will be understood that these embodiments are not intended to be limiting.

There are many concepts and implementations described and illustrated herein. While certain features, attributes and advantages of the implementations discussed herein have been described and illustrated, it should be understood that many others, as well as different and/or similar implementations, features, attributes and advantages of the present disclosure, are apparent from the description and illustrations. As such, the below implementations are merely exemplary. They are not intended to be exhaustive or to limit the disclosure to the precise forms, techniques, materials and/or configurations disclosed. Many modifications and variations are possible in light of this disclosure. It is to be understood that other implementations may be utilized and operational changes may be made without departing from the scope of the present disclosure. As such, the scope of the disclosure is not limited solely to the description below because the description of the below implementations has been presented for the purposes of illustration and description.

The present disclosure is neither limited to any single aspect nor implementation, nor to any single combination and/or permutation of such aspects and/or implementations. Moreover, each of the aspects of the present disclosure, and/or implementations thereof, may be employed alone or in combination with one or more of the other aspects and/or implementations thereof. For the sake of brevity, many of those permutations and combinations will not be discussed and/or illustrated separately herein.

Disclosed herein are embodiments, implementations, methods, techniques, and apparatuses for measuring the flatness of an end effector used in semiconductor fabrication processes. An end effector is an end portion of a robot arm that may be used to pick up, hold, transfer, and/or place a wafer (as used herein, a "wafer" refers to both a semiconductor wafer and/or substrate). In some semiconductor processing, an end effector may transfer a wafer from a location outside the semiconductor processing tool ("tool") to one or more locations within the tool, including, but not limited to processing stations, air locks, load locks, etc. For instance, a front opening unified pod ("FOUP") may contain one or more wafers and may be installed onto a tool. The tool may use an end effector to transfer the one or more wafers from the FOUP and into one or more locations within the tool, such as a load lock, air lock, and/or processing chamber. In some such processing, the tool may also use one or more other end effectors to transfer a wafer between other locations of the tool, such as between processing chambers and from a processing chamber to an air lock. The end effector may be configured to move in numerous spatial directions, such as along x-, y-, and z-axes, as well as for rotational movement about the z-axis (sometimes referred to as theta, symbolized by "θ") directions by, for instance, a motor mechanism or movement mechanism.

Figure 2:
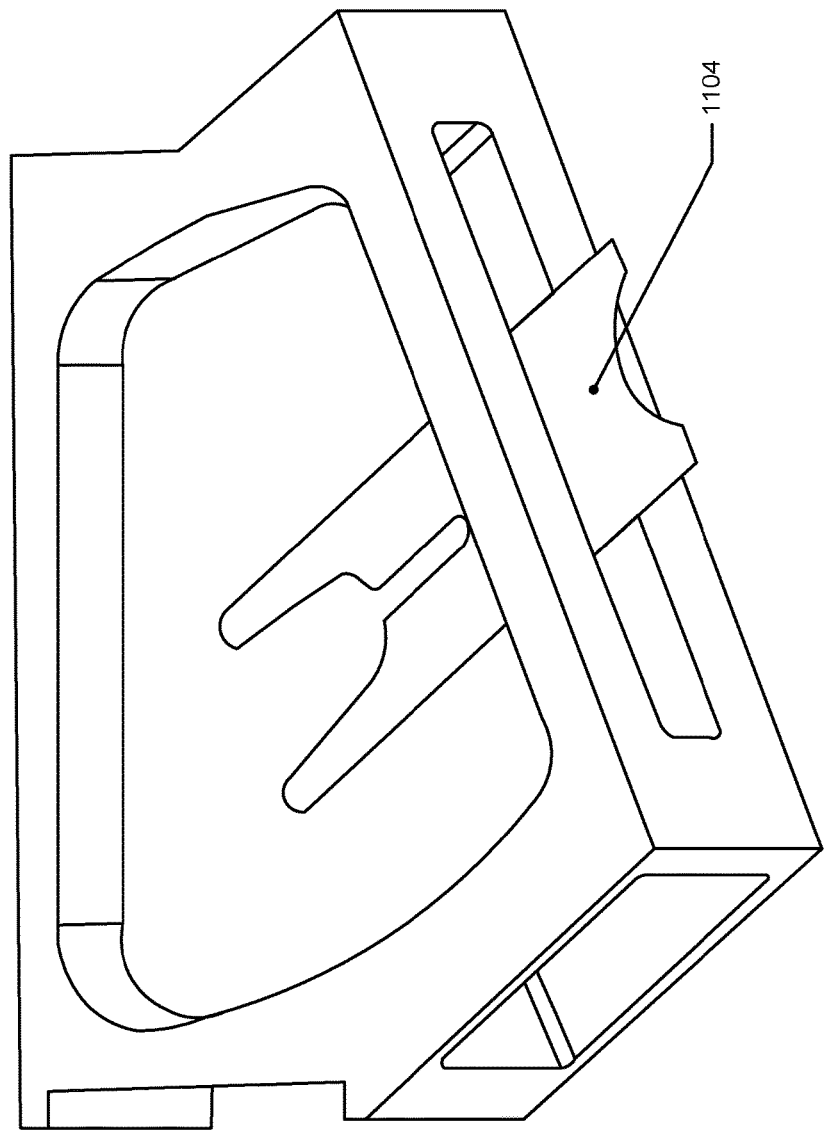
FIG. 2 depicts an off-angle view of an example partial, uncovered air lock of a semiconductor processing tool with an example end effector.

Some end effectors may be made, at least in part, of metal and are configured to hold a wafer. Some end effectors may include pads (which may, in some cases be made of rubber or other non-conductive material) that support the wafer such that the wafer does not contact the end effector other than at these designated wafer support locations (e.g. pads, wafer support pads, wafer supports). FIG. 1 depicts a plan view of an example end effector. As can be seen, end effector 1104 is depicted and includes four circular wafer support pads 1110. This end effector may be used, at least in part, to transfer a wafer into, out of, and within an air lock. FIG. 2 depicts an off-angle view of an example partial, uncovered air lock of a semiconductor processing tool with an example end effector. FIG. 3 depicts a plan view of the example air lock and end effector of FIG. 2. As shown in FIGS. 2 and 3, the end effector 1104 extends into a portion of the air lock 1102.

In many semiconductor processes, the end effector is not intended to contact the wafer at locations other than the designated wafer support locations, e.g., wafer support pads. The present inventors have determined that end effectors that deflect more than intended, or that have been damaged such that there is permanent deformation in the end effectors, may cause wafers that are supported thereon to rub against portions of the end effectors. Any unintended contact between the end effector and a wafer supported by the end effector may damage the wafer and or the end effector, or otherwise adversely affect processing of wafers (for instance, a wafer may be undamaged, but the wafer may rub against the end effector which may produce particulates that may in turn contaminate the wafer and/or other wafers). The present inventors determined that periodic testing to determine the degree of flatness in the end effectors may assist in identifying end effectors with an undesirable degree of deformation when loaded with a wafer. In some such semiconductor processes, maintaining a straight and/or flat end effector in an area surrounding the wafer may ensure that the end effector and the wafer do not contact each other. Contact between a wafer and end effector, at locations other than the wafer support locations, may be caused by numerous conditions and factors, including, for example, an end effector that is bent, warped, and/or damaged.

In order to prevent a wafer from contacting an end effector, most end effectors may be configured such that the pads may not only support the wafer, but also separate the wafer from the end effector by a certain distance or clearance. FIG. 4 depicts a cross-sectional view of an example end effector supporting a wafer. As can be seen, the end effector 404 includes two pads 410 which support the wafer 452. The wafer 452 is separated from a top surface of the end effector 404 by a clearance distance 454. The clearance distance 454 between the wafer 452 and the end effector 404 may differ based on numerous factors, including, but not limited to, the weight and center of gravity of the wafer, wafer deformity, variance, and/or shape, the material of the end effector 404, and/or the processing conditions (e.g., temperature and pressure). The clearance distance may be chosen to ensure the wafer and the end effector do not touch given certain circumstances, conditions, or other parameters.

End effectors such as those discussed herein may deflect, or bend, when a wafer is placed onto the end effector due to the cantilevered loading exerted on the end effector by the wafer. In such situations, the minimum clearance distance between the end effector and the wafer may decrease in one or more locations. FIG. 5 depicts a cross section view of the end effector of FIG. 4 in a deflected state. Similar to FIG. 4, the end effector 404 is supporting the wafer 452 using the pads 410. However, in FIG. 5, the end effector 404 is deflected such that the wafer 452 and the end effector 404 are separated by a minimum separation distance 456 at a certain location which is less than the clearance distance 454 in FIG. 4. In one instance, the clearance distance 454 may be about 0.025 inches and the minimum separation distance 456 may be about 0.022 inches.

As mentioned above, a wafer and end effector may contact each other due to the end effector's flatness or straightness not being within a desired threshold. For instance, FIG. 6 depicts an example bent end effector. The end effector 404, pads 410, and wafer 452 are similar to that shown in FIG. 4, but here the end effector 404 is bent such that the wafer 452 and the end effector 404 are in contact, which is not desirable, as discussed above.

Accordingly, maintaining the flatness of the end effector within a certain parameter, threshold, and/or range may prevent contact between the end effector and the wafer. One way to adequately accomplish this is to measure the flatness of the end effector—end effectors that do not have the desired level of flatness may be removed and recycled or discarded and replaced with a new end effector. As discussed herein, the inventors of the present disclosure have developed novel methods, systems, techniques, and apparatuses to measure various aspects of an end effector in a semiconductor processing tool, including measurements allowing for an estimation of the flatness of the end effector.

Some traditional ways in which the flatness of an end effector may be measured are costly and time-consuming. For instance, one such measurement method is to remove the end effector from the tool and place it on a particular granite stone, which requires significant tool downtime and labor in order to disassemble and remove the end effector from the tool, remove measure the end effector, reinstall the end effector, and recalibrate the tool. This method also relies upon a user's visual assessment which may not provide accurate results. Another example method uses lasers to measure the flatness, but this method is costly, time and labor intensive, has a long setup time, and lasers are not typically placed on end-consumer semiconductor processing tools. A third possible technique is to manually place a gauge below the end effector and assert upwards pressure in order to determine the flatness; but this determination is made visually by a user and may present false results due to inadvertent deformation caused by applying the gauge to the end effector.

The present disclosure uses the concept of electrical continuity between a probe and an end effector to determine a series of vertical height measurements of the end effector with respect to a reference plane, which may be used to determine different aspects of the end effector, such as an estimate of the wafer plane and the end effector's flatness with respect to the wafer plane. Electrical continuity occurs when an electrical path is established between two points. In some embodiments, end effector flatness is determined using measured vertical heights of different points of the end effector—these measurements may be obtained by obtaining the z-axis coordinate of the end effector at the moment that electrical continuity occurs. For example, measurement heights of an end effector, as described herein, may provide an indication of the end effector's wafer plane and whether the end effector contains regions which may get too close to and/or invade such a wafer plane. Each vertical height measurement of the end effector may be obtained by moving the end effector downwards until a measuring point of the end effector contacts a probe such that when they are in contact, an electrically conductive path is established. Once the electrically conductive path is established, as indicated, for example, by a light, tone, display readout, or other signal, the vertical movement of the end effector may be stopped and the z-axis location of the end effector may provide the vertical height measurement.

The end effector begins above the probe and is moved downwards in a vertical direction towards the probe until electrically conductive contact is made between the measuring point of the end effector and the probe. The measured vertical height measurement is the vertical height of the end effector, with respect to a reference plane, when electrical continuity first occurs between the measuring point of the end effector and the probe during the movement of the end effector in the vertical direction. Electrical continuity provides an accurate measurement of an end effector's height because it enables point contact to occur between a probe and the end effector with minimal to no deflection of the end effector. By performing such measurements for multiple points along an end effector, an estimate of end effector flatness may be calculated.

Many contact-measurement techniques currently used of flexible end effectors are inherently inaccurate and/or non-repeatable because the flexible end effector that is being measured moves when it is contacted by the contact measurement device. However, the embodiments, implementations, and techniques described herein use the concept of electrical continuity which enables the use of a very light contact between a measuring device and a flexible end effector which minimizes the flexing of the end effector, which thus reduces the measurement error. Such techniques and apparatuses described herein are also low cost and simple as compared to other techniques and/or apparatuses currently used.

Figure 7:
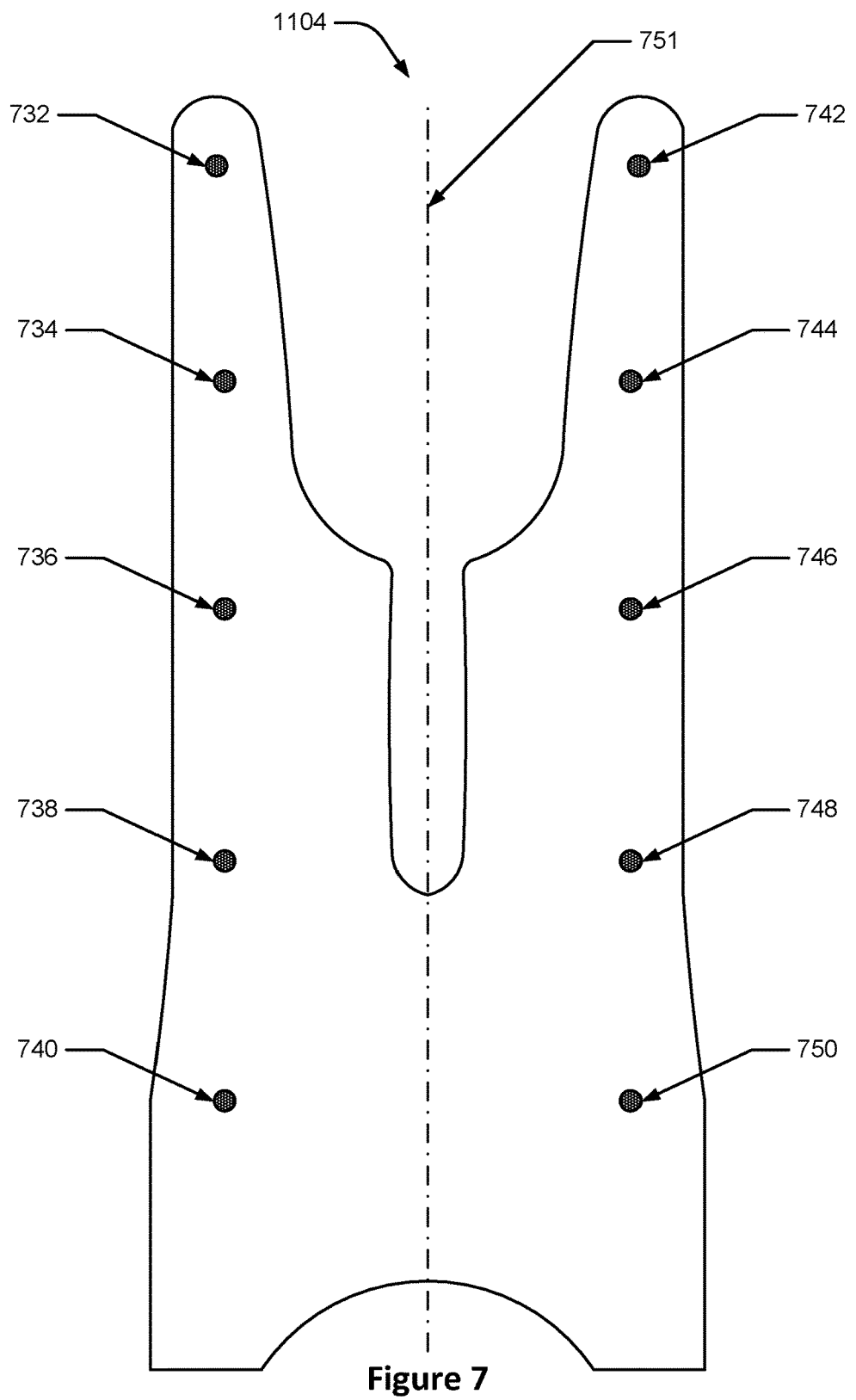
FIG. 7 depicts an example end effector with ten labeled measuring points.

For example, in some embodiments, flatness of an end effector may be determined using the measured height of the end effector at ten different measuring points on the end effector. FIG. 7 depicts an example end effector with ten labeled measuring points. As can be seen, the example end effector 1104 includes a total of ten measuring points, with five located along the left side (i.e., the left side of the first axis 751) labeled 732 through 740 and with five along the right side, labeled 742 through 750. These ten measuring points 732 through 750 may not be marked on the end effector, but are represented in FIG. 7 as shaded circles. It is at these ten points that contact may be made with the probe in order to create electrical continuity. In some embodiments, one or more of the measuring points of an end effector may be substantially proximate to a wafer support pad of the end effector. For instance, the measuring point may be within about a 1 inch radius of a wafer support pad. The measuring points may be spaced any number of ways on the end effector in order to produce relevant results. For example, they may be equally spaced from each other, such as 2 inches apart, or they may be concentrated in certain locations, such as near a mid-point between wafer supports.

A portion of the probe that makes contact with the end effector and at least the measuring points of the end effector may be electrically conductive and configured to create an electrically conductive path when contact is made between the probe and each measuring point. In some such embodiments, the entire end effector may be electrically conductive. In some other such embodiments, the end effector may be coated with a non-conductive coating yet, at each measuring point, it may be configured to be electrically conductive, e.g., the coating may be removed or otherwise absent, such that when contact is made with the probe, an electrically conductive path is established.

Figure 8:
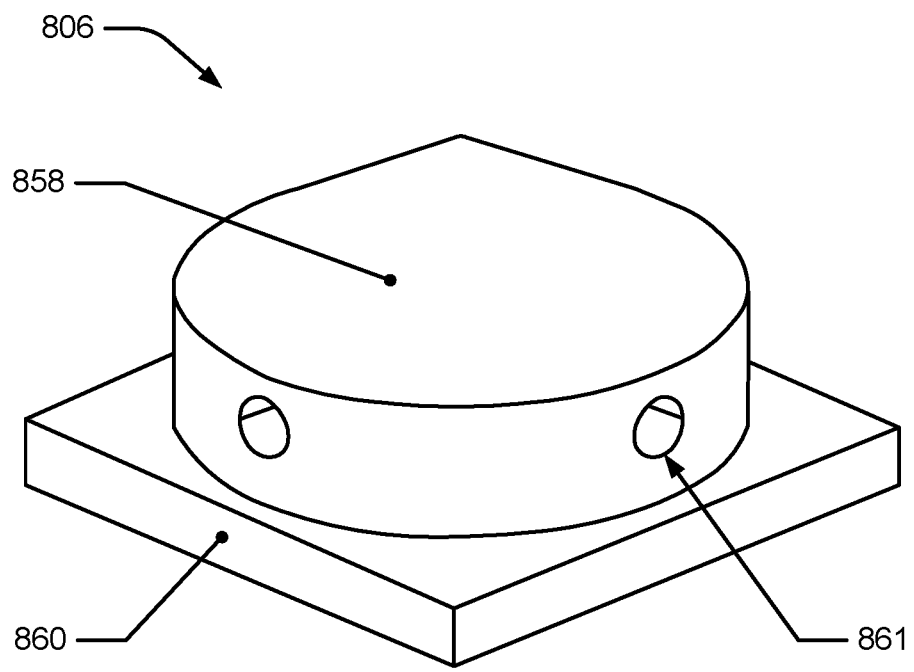
FIG. 8 depicts an off-angle view of a probe.

The probe may be configured in numerous ways. In some embodiments, the probe may include a conductive portion and a non-conductive base, as shown in FIG. 8 which depicts an off-angle view of a probe. The conductive portion 858 of the probe 806 can be seen mounted to the non-conductive base 860. The probe 806 may also be configured to electrically connect to an electrical continuity detector (not shown). This electrical connection may occur by any method known in the art. In some such configurations, the probe 806 may include electrical connection ports 861 as shown in FIG. 8 where an electrical cable may be electrically connected to the probe 806. The point or tip of the probe may be rounded, pointed, flat, or some other shape. The probe may be configured to create a point contact with the end effector such that a substantially small area of the probe contacts the end effector. For instance, the tip may be considered "sharpened" such that is similar to a pin head. Some further configurations of and embodiments using the probe are discussed below. Other configurations of probe may be used as well.

Figure 9:
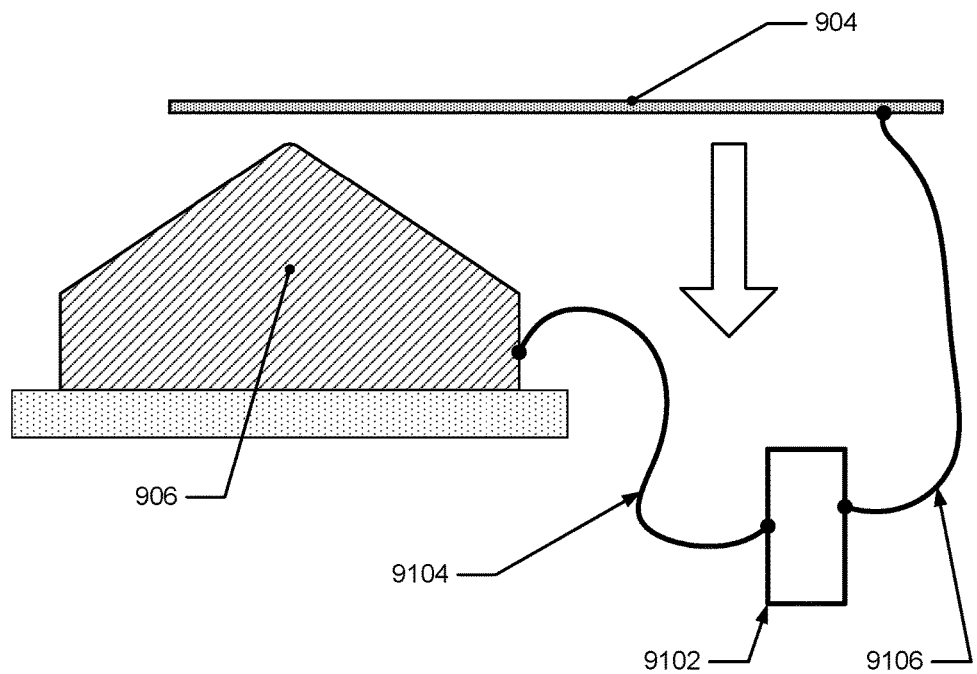
FIG. 9 depicts an example end effector moving vertically downwards towards the probe.
Figure 10:
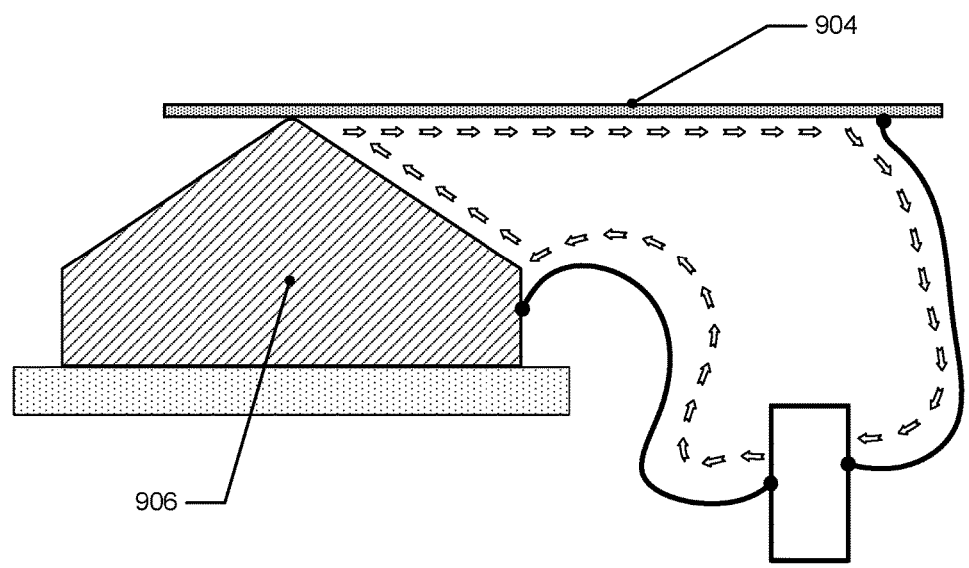
FIG. 10 depicts established electrical continuity between the probe and the demonstrative end effector in FIG. 9.

As stated above, in some embodiments, the end effector is moved downwards in a vertical direction in order to create electrically conductive contact between a measuring point of the end effector and the probe. FIG. 9 depicts an example end effector moving vertically downwards towards the probe. The arrow in FIG. 9 indicates that the demonstrative end effector 904 is moving in the vertical direction towards the probe 906. A first electrical cable 9104 is shown electrically connecting the probe 906 with an electrical continuity detector 9102 and a second electrical cable 9106 is electrically connecting the demonstrative end effector 904 with the electrical continuity detector 9102. In some embodiments, the probe or end effector may be grounded, and the second electrical cable 9106 may be connected to ground as well FIG. 10 depicts established electrical continuity between the probe and the demonstrative end effector in FIG. 9. The small white arrows in FIG. 10 indicate the electrically conductive path that is created when the demonstrative end effector 904 and the probe 906 are in electrically conductive contact, e.g., the flow of current. In some such embodiments, the electrical continuity detector 9102 is configured to detect this electrical continuity, and the electrical continuity detector may be a multimeter, while in some other embodiments, it may be a part of a controller that is configured to detect electrical continuity.

Because different measuring locations of the end effector are to be measured, the probe and end effector must be moved relative to each other parallel to the XY plane. As part of this disclosure, the inventors have determined that there are at least two general embodiments in which this movement may occur: (1) movement of the probe between different XY locations while the end effector is raised and (2) movement of the raised end effector in an x- and/or y-direction between different XY locations while the probe remains stationary. In such embodiments, the x-direction is orthogonal to the y-direction, and the x- and y-directions are perpendicular to the z-direction (i.e., vertical direction). These general embodiments will be discussed in turn below. It is also contemplated that a combination of these two embodiments may be used as well, for example, in some embodiments the end effector may move between two or more locations and the probe may also move between two or more locations.

The first general embodiment that includes movement of the probe between locations while the end effector moves in the vertical direction but stays stationary in the XY directions will now be discussed. Measuring the height of the end effector as described herein may occur in different parts of a semiconductor processing tool, but for explanation purposes, measuring the end effector in an air lock will be discussed. In some such embodiments, the probe may be placed on the interior floor, or bottom, of the air lock such that the end effector may move above the probe. The probe may be moved inside the air lock between measurements, such as by a user or mechanical means, so that the probe is located in more than one location in order to contact more than one measuring point of the end effector. Multiple means may be used to locate the probe within the air lock (or other portions of the tool), such as a guide (with one or more physical locations at which the probe can be placed), a schematic, or markings and/or fixtures located on the air lock floor. In some such embodiments, a jig may be used which is configured to guide the placement of, i.e., to position the probe, at the one or more locations inside the airlock. The jig may also be located onto the floor of the air lock and may be secured to the air lock by numerous means, including mounting mechanisms, pins, screws, clamps, and the like. The jig may be configured to fit and/or be placed in any suitable portion of the tool in order to enable contact between the probe and end effector to create electrical continuity as herein described. An example jig is shown in various Figures herein, although it is to be understood that such a jig may take a number of different forms and is not limited to the specific variant depicted herein.

Figure 11:
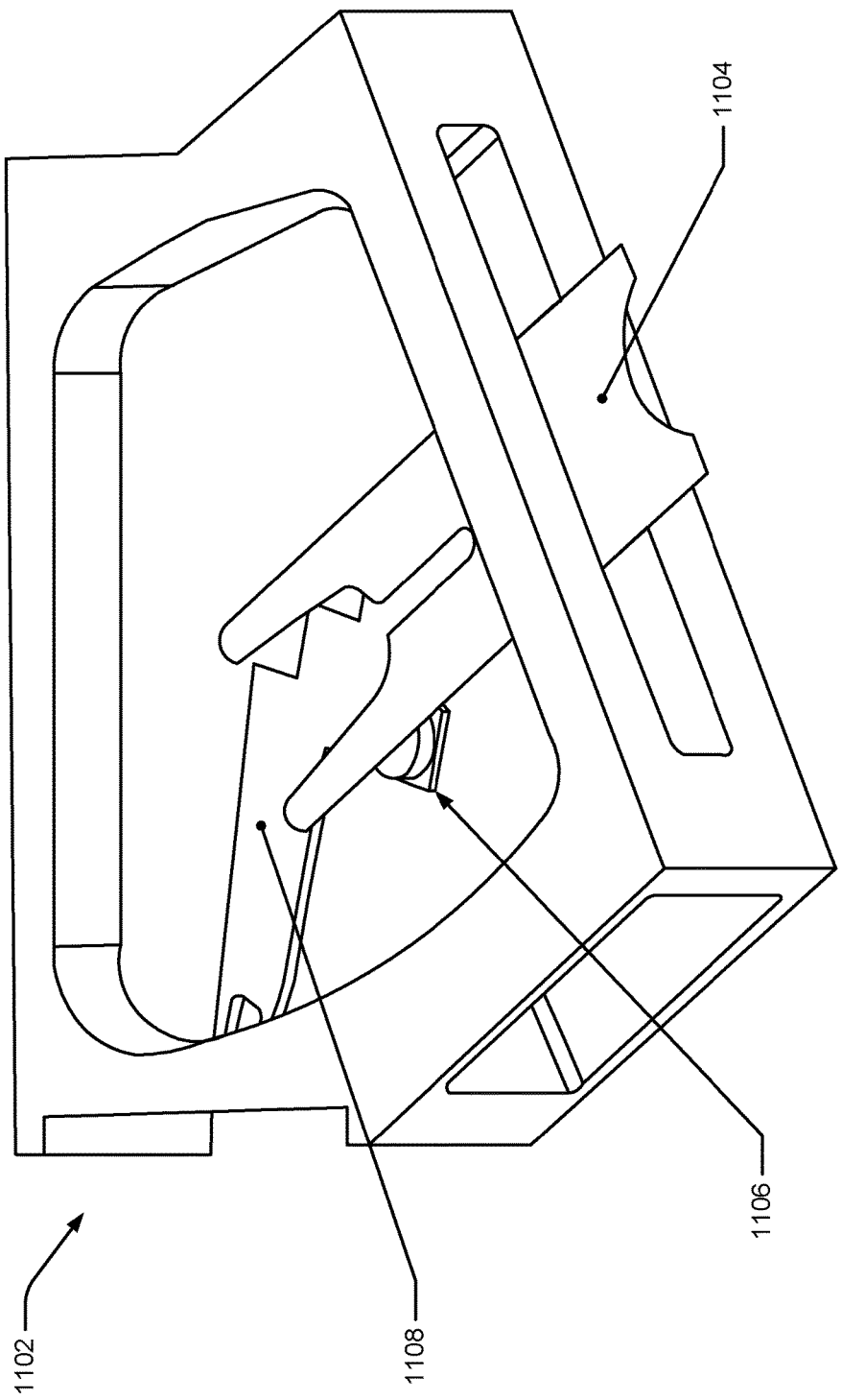
FIG. 11 depicts an off-angle view of an example air lock with an end effector, a probe, and a jig.

FIG. 11 depicts an off-angle view of an example air lock with an end effector, a probe, and a jig. As can be seen, the end effector 1104 extends into the airlock 1102 and is located above a probe 1106 and a jig 1108. The end effector 1104 is partially obscuring the full view of the probe 1106 and the jig 1108 which are both located on the floor of the air lock. The probe 1106 is similar to the probe shown in FIG. 8; it has a conductive portion and a non-conductive base. In some embodiments, the air lock 1102 and or end effector 1104 may be electrically grounded.

Figure 12:
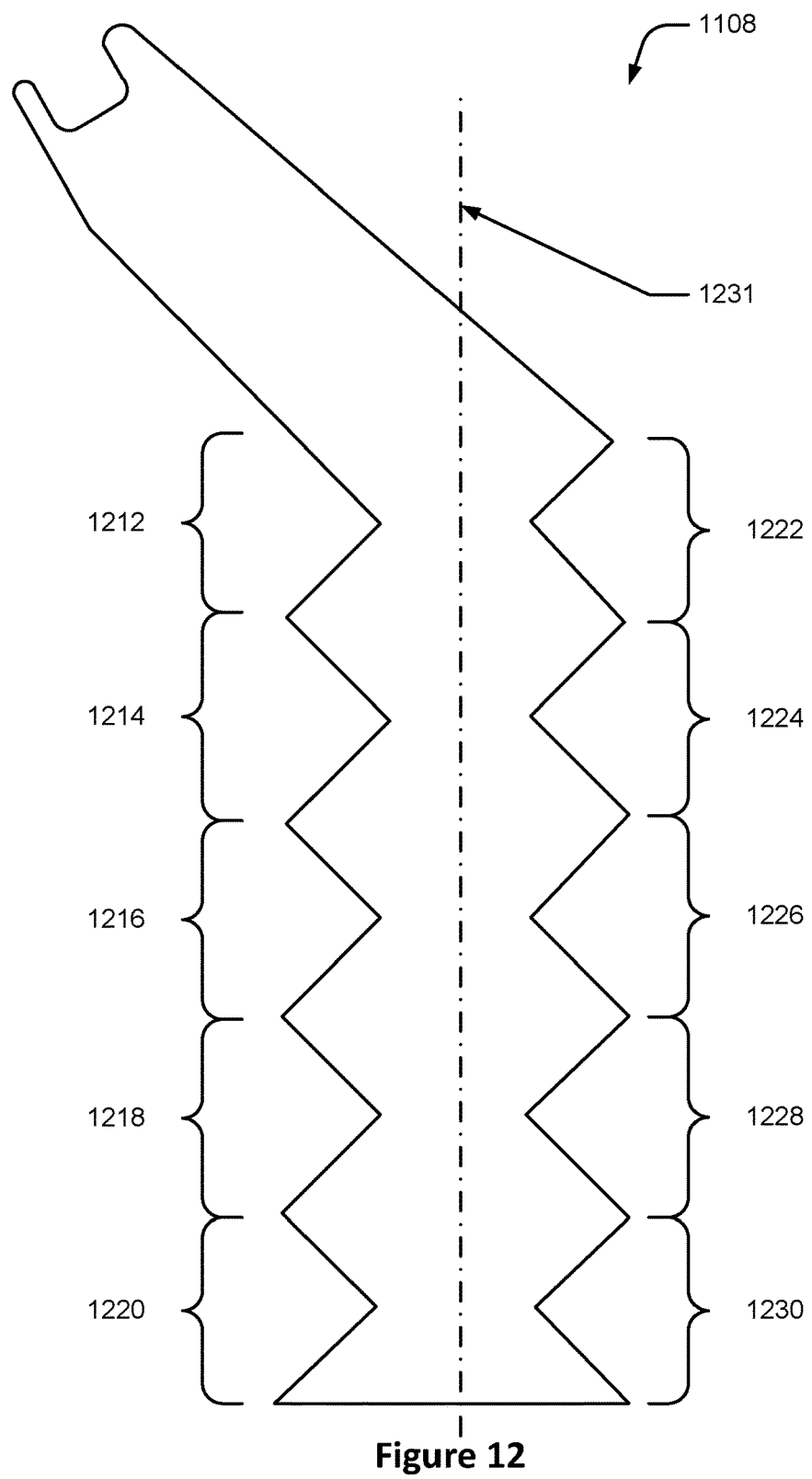
FIG. 12 depicts a plan view of an example jig.

FIG. 12 depicts a plan view of an example jig. The jig 1108 in FIG. 12 includes ten locations to position the probe. On the left (of the second axis 1231) the jig includes a first location 1212, a second location 1214, a third location 1216, a fourth location 1218, and a fifth location 1220. On the right side, the jig includes a sixth position 1222, a seventh location 1224, an eighth location 1226, a ninth location 1228, and a tenth location 1230. A jig may also have more than ten, or less than ten locations to position the probe. In some embodiments, the jig may have eight total locations, with four on each side. In some embodiments, each location is different from other locations. The jig may also be made of a non-conductive material, such as a polymer.

Figure 13:
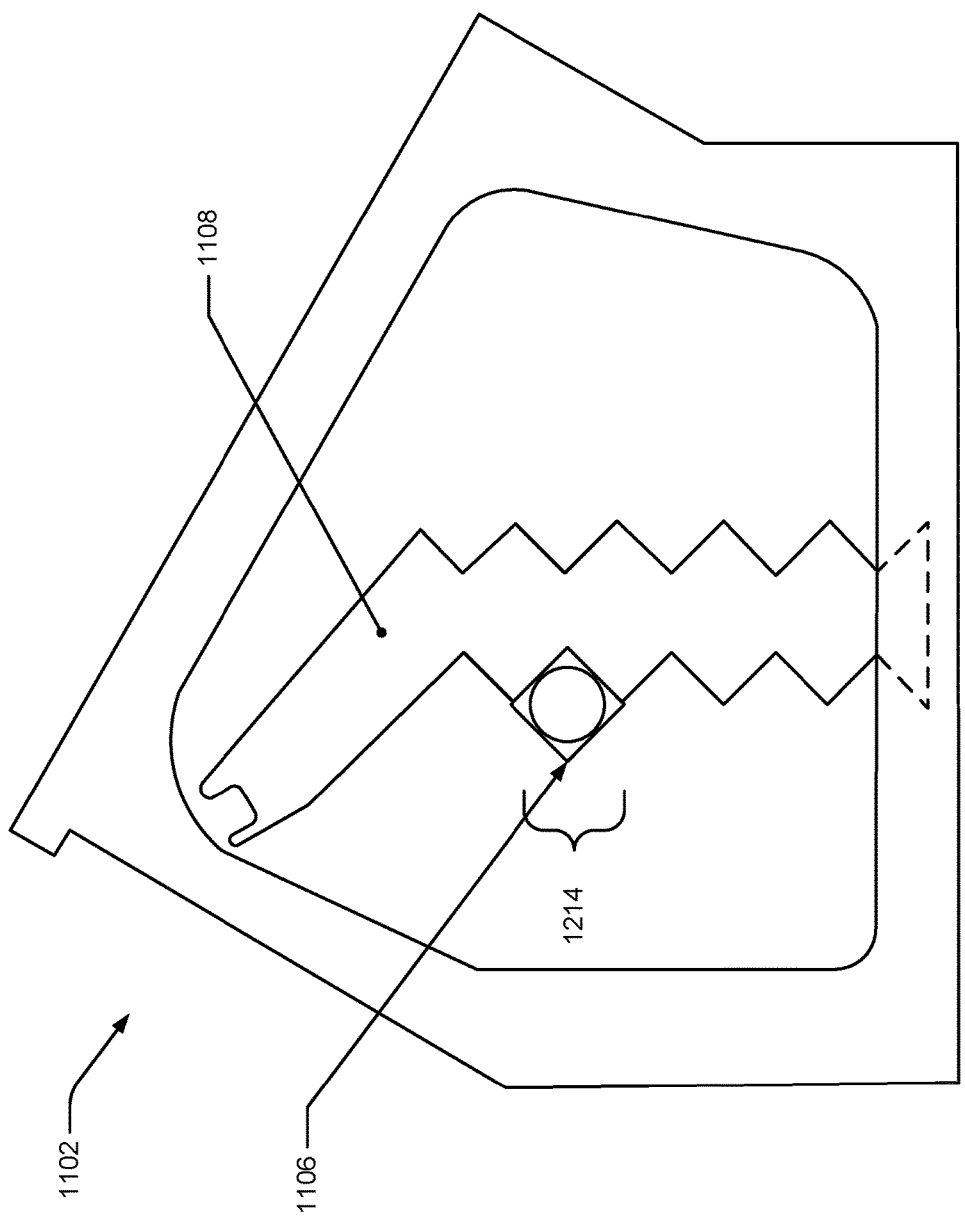
FIG. 13 depicts a plan view of the probe and the jig located inside the air lock.
Figure 14:
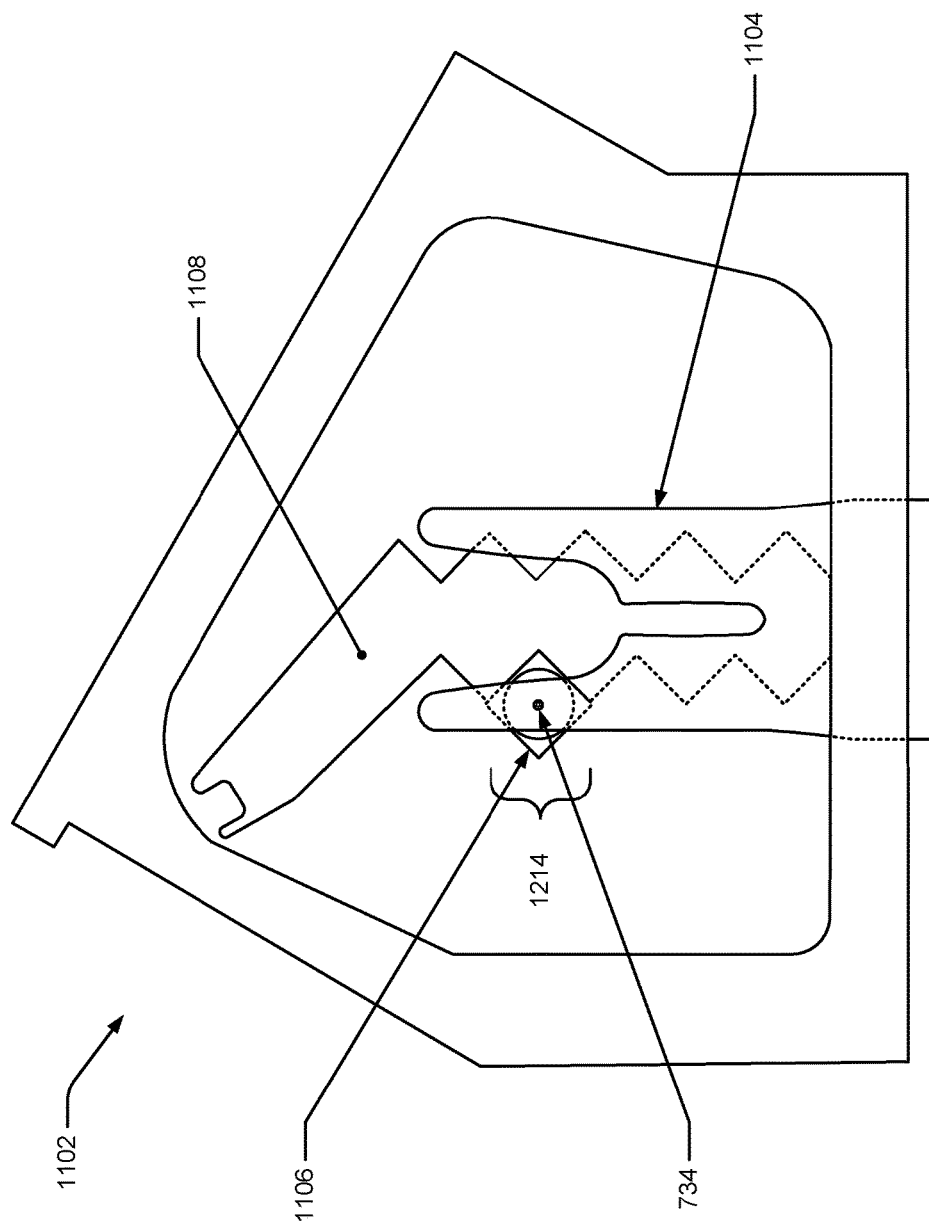
FIG. 14 depicts a plan view of the air lock of FIG. 13 along with the end effector above the jig and the probe.

FIG. 13 depicts a plan view of the probe and the jig located inside the air lock. The jig 1108 and the probe 1106 are both located on the floor of the air lock 1102, similar to FIG. 11, and the jig 1108 is the jig shown in FIG. 12. As can be seen, the probe 1106 is positioned in the second location 1214 of the jig 1108. With the end effector extended into the air lock above the probe positioned at the second location, the end effector may be able to move vertically downwards to contact the probe at a specific measuring location of the end effector, as exemplified in FIG. 14. FIG. 14 depicts a plan view of the air lock of FIG. 13 along with the end effector above the jig and the probe. The end effector 1104 seen in FIG. 14 is similar to that in FIG. 7 such that the end effector 1104 includes ten measuring locations, but only one measuring location, the second measuring location 734, is identified in FIG. 14. The probe is positioned at the second location 1214 such that the probe may contact the second measuring location 734 of the end effector 1104 when the end effector moves vertically.

In some such embodiments, the probe 1108 and the end effector 1104 may be configured to be electrically connected to an electrical continuity detector (not shown) such that when the end effector 1104 moves vertically downwards to create electrically conductive contact between the second measuring point 734 and the probe 1106, an electrically conductive path is created, as discussed above regarding FIGS. 9 and 10. The electrical continuity detector, or other device such as a controller (discussed below), may determine when the probe 1106 and the second measuring point 734 have formed electrical continuity.

Figure 15:
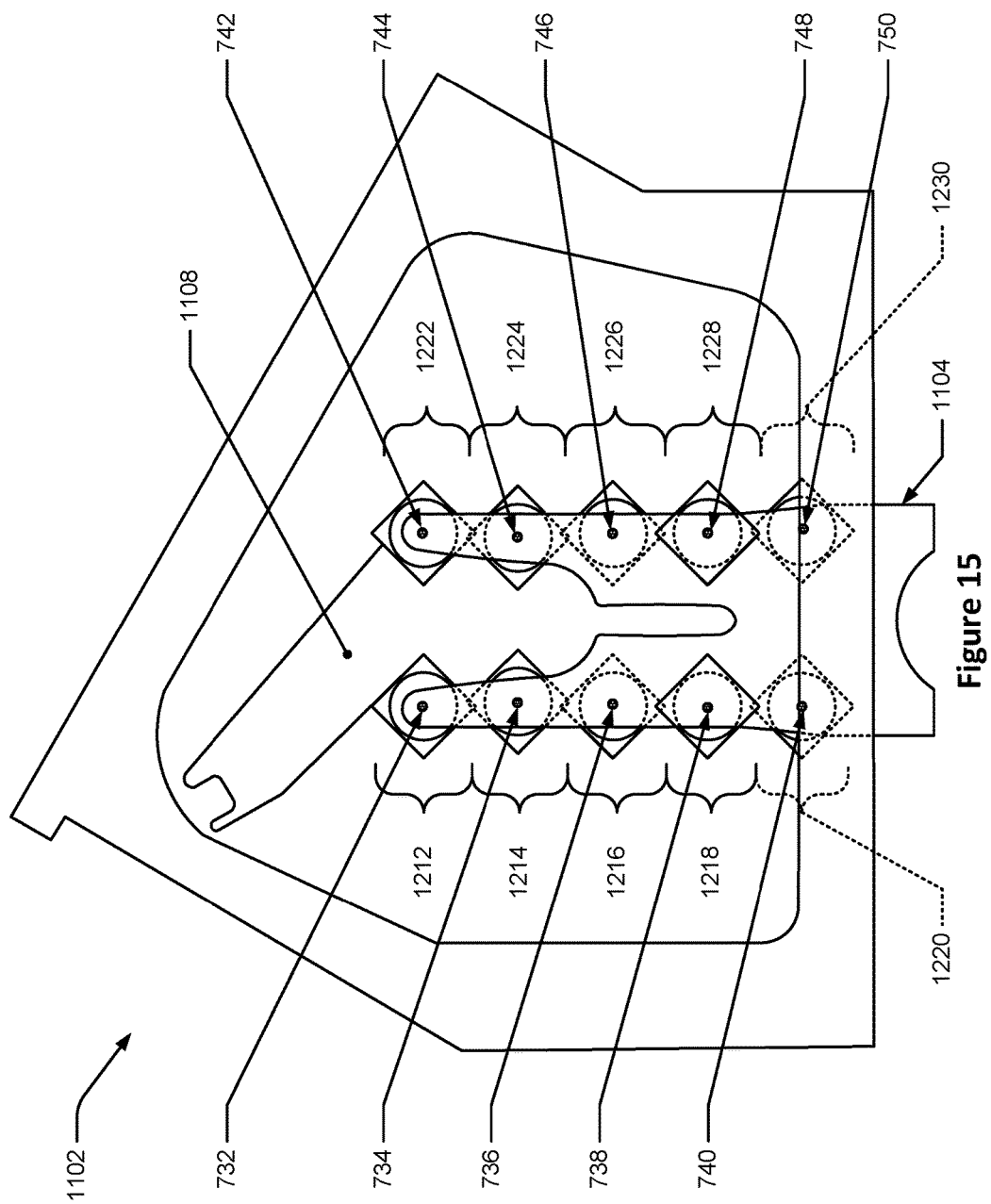
FIG. 15 depicts a plan view of the air lock, jig, and end effector in FIG. 14.

As mentioned above, the probe 1106 may be repositioned in different locations of the jig 1108 such that contact between the probe 1106 and the end effector 1104 may occur at different measuring points of the end effector. FIG. 15 depicts a plan view of the air lock, jig, and end effector in FIG. 14. Here, the probe (depicted but not identified) is shown in all ten locations of the jig 1108. In practice, more than one probe would not likely be placed in multiple locations at the same time since contact between one probe and the end effector could deflect the end effector and affect the vertical height measurement at the other probe. Here, the multiple probes are shown for demonstrative purposes. The probe can be seen in the first location 1212 such that the probe may contact the end effector at the first measuring point 732, in the second location 1214 such that the probe may contact the end effector at the second measuring point 734, in the third location 1216 such that the probe may contact the end effector at the third measuring point 736, in the fourth location 1218 such that the probe may contact the end effector at the fourth measuring point 736, and in the fifth location 1220 such that the probe may contact the end effector at the fifth measuring point 740. The same is repeated on the right side of the end effector 1104 with locations 1222 through 1230 and measuring points 742 through 750, respectively.

In some embodiments, as stated hereinabove, the semiconductor processing tool is configured to move the end effector in a vertical direction using one or more movement mechanisms. In some such embodiments, this vertical direction may be considered perpendicular to a floor or bottom of a portion of the tool, or to the floor on which the tool is located. The vertical direction may also be perpendicular to a nominal plane in which the wafer is held by the end effector, sometimes referred to as a "wafer holding" or "wafer transfer" plane (this plane is defined assuming there is no deflection in the end effector). The tool may be configured to detect and/or store the positions of the end effector, including the x-, y-, z-, and/or theta directions. Wafer handling robots are typically equipped with sensors that may provide such positional measurements. In some such embodiments, such continuity detection and storing of the measurements may be performed by a controller of the tool. In other embodiments, the continuity detection and storing of the measurements may be done manually, e.g., an operator may monitor a continuity tester to determine when continuity occurs, and then record the vertical height measurement in a spreadsheet or other medium.

In some embodiments, the controller (or the functionality thereof) may be a processor-based controller, or may be part of a processor-based controller (such as a semiconductor processing tool controller). For example, a semiconductor processing tool may be controlled by one or more computers that are communicatively connected with various actuators, valves, sensors, relays, etc. and that control such components in order to carry out the steps of a semiconductor manufacturing process. Such a controller may include various input/output interfaces that allow the controller to control a piece of electronic equipment, such as an end effector, that is connected to one of the input/output interfaces. Such a controller may also be configured to receive, process, and/or store one or more signals from a piece of electronic equipment, such as from motor mechanisms, sensors, or the like, that is connected to one of the input/output interfaces.

Figure 16:
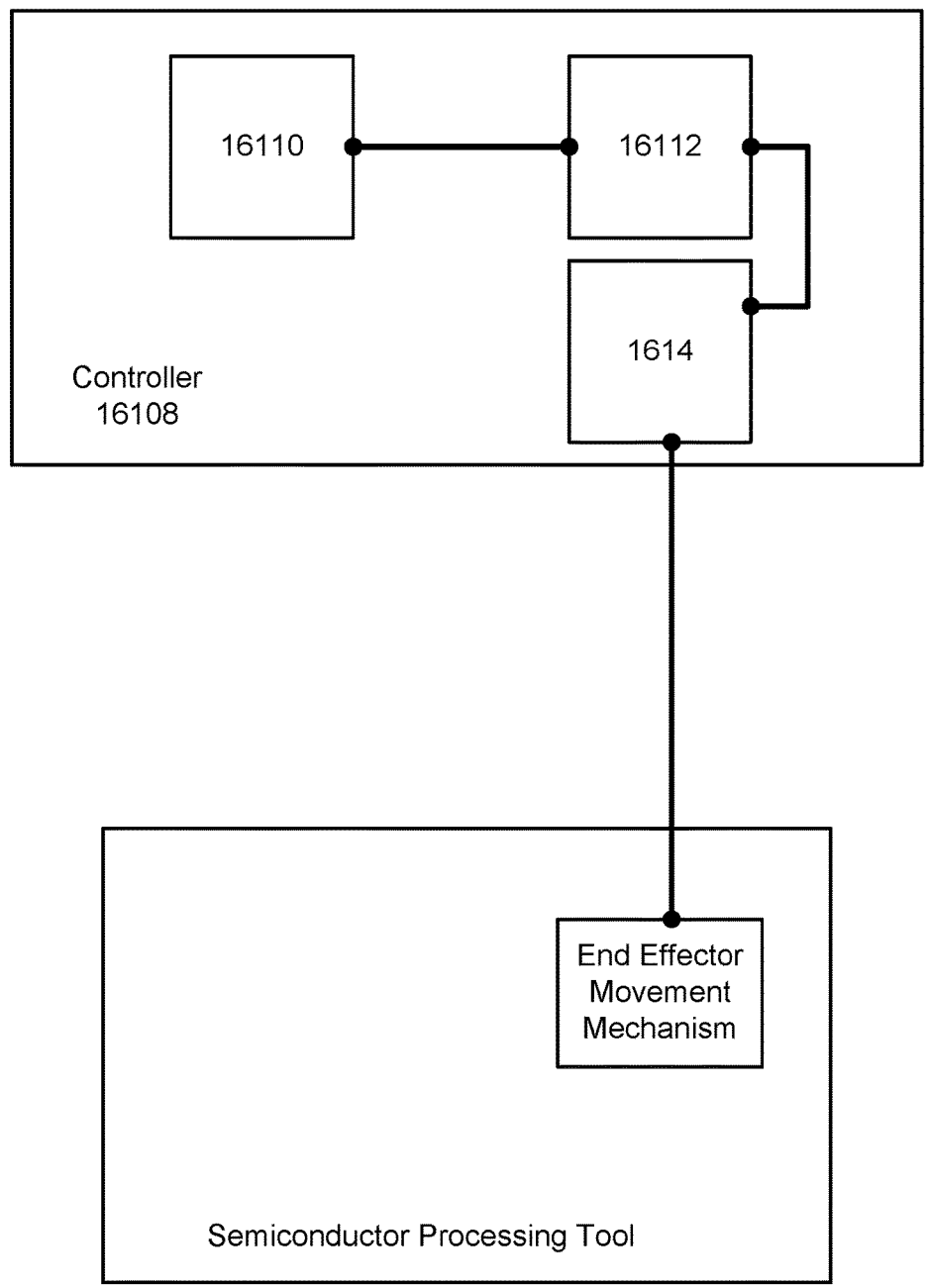
FIG. 16 depicts an example a processor-based controller for a semiconductor processing tool.

FIG. 16 depicts an example a processor-based controller for a semiconductor processing tool. The processor-based controller 16108 may include one or more memory devices 16110 that may include one or more mass storage devices (not shown), and one or more processors 16112. The processor 16112 may include a CPU or computer, analog and/or digital input/output connections, etc. The memory may store computer-executable instructions for controlling the processor to perform various functions as described in more detail below. In some implementations, the processor-based controller 16108 may be configured to control the movement of the end effector, including in the vertical direction. In some implementations, the processor-based controller 16108 may control all of the activities of the semiconductor processing tool. In other implementations, the processor-based controller 16108 may be dedicated to only controlling a subset of components of the semiconductor processing tool that includes the end effector. In such cases, the various functions and capabilities described below may be tailored to suit the level of control that the processor-based controller 16108 has. For example, if the processor-based controller 16108 is dedicated to only control end effectors, then the functionality described below regarding control of valves, mass flow controllers, and other process equipment may be included in a different controller of the semiconductor processing tool.

The processor 16112 of the processor-based controller 16108 may execute system control software stored in and loaded into the memory 16110. The system control software may include instructions for controlling the timing, mixture of gases, chamber and/or station pressure, chamber and/or station temperature, wafer temperature, target power levels, RF power levels, substrate pedestal, chuck and/or susceptor position, movement of end effectors, and other parameters of a particular process performed by the semiconductor processing tool. The system control software may be configured in any suitable way. For example, various process tool component subroutines or control objects may be written to control operation of the process tool components necessary to carry out various process tool processes. System control software may be coded in any suitable computer readable programming language.

In some embodiments, system control software may include input/output control (IOC) sequencing instructions for controlling the various parameters described above, as well as for receiving signals from devices, such as the mechanism(s) that move the end effector, signals from an electronic continuity detector, and/or signals from a probe and/or end effector. In some implementations, there may be a user interface associated with the processor-based controller 16108. The user interface may include a display screen, graphical software displays of the apparatus and/or process conditions, and user input devices such as pointing devices, keyboards, touch screens, microphones, etc.

Signals for monitoring the process, end effector, and/or probe may be provided by analog and/or digital communications to the processor-based controller 16108 from various process tool sensors. The controller may include an input/output interface 1614 to receive and send signals to and from the semiconductor processing tool, including the end effector movement mechanism, as shown in FIG. 16. The signals for controlling the process may be provided via analog and/or digital output connections of the semiconductor processing tool. Non-limiting examples of process tool sensors that may be monitored include mass flow controllers, pressure sensors (such as manometers), thermocouples, a sensor for determining the position of the end effector, and/or a sensor for determining electrical continuity between the probe and the end effector. Appropriately programmed feedback and control algorithms may be used with data from these sensors to maintain process conditions as well as to move the end effector to create electrically conductive contact between the end effector and the probe. The processor-based controller 16108 may provide program instructions for implementing various semiconductor fabrication processes. The program instructions may control a variety of process parameters, such as DC power level, RF bias power level, pressure, and temperature. As discussed earlier, in some implementations, the processor-based controller 16108 may be a separate unit from a controller that controls the overall tool operation, e.g., in a retrofit kit, and the semiconductor processing tool may already include a controller that is configured to control aspects of the semiconductor processing tool.

In some embodiments, the controller may be configured to receive signals from an electrical continuity detector, including a signal indicating that electrical continuity is established between the probe and the end effector. The controller may further be configured to determine when electrical continuity is established between the probe and the end effector, as well as to store the vertical position of the end effector when electrical continuity first occurs between the end effector and the probe during the movement of the end effector in the vertical direction. The controller may also be configured to perform, at least in part, as an electrical continuity detector. In some such embodiments, the controller may be electrically connected to the probe and the end effector, and configured to apply a voltage to one of the electrical connections to the probe or end effector, and configured to detect that an electrically conductive path is created between the probe and end effector. The controller may also be configured to compute or determine the flatness (e.g., whether the end effector falls within a specific flatness parameter or range) based on measurements of the vertical heights of the end effector.

Figure 17:
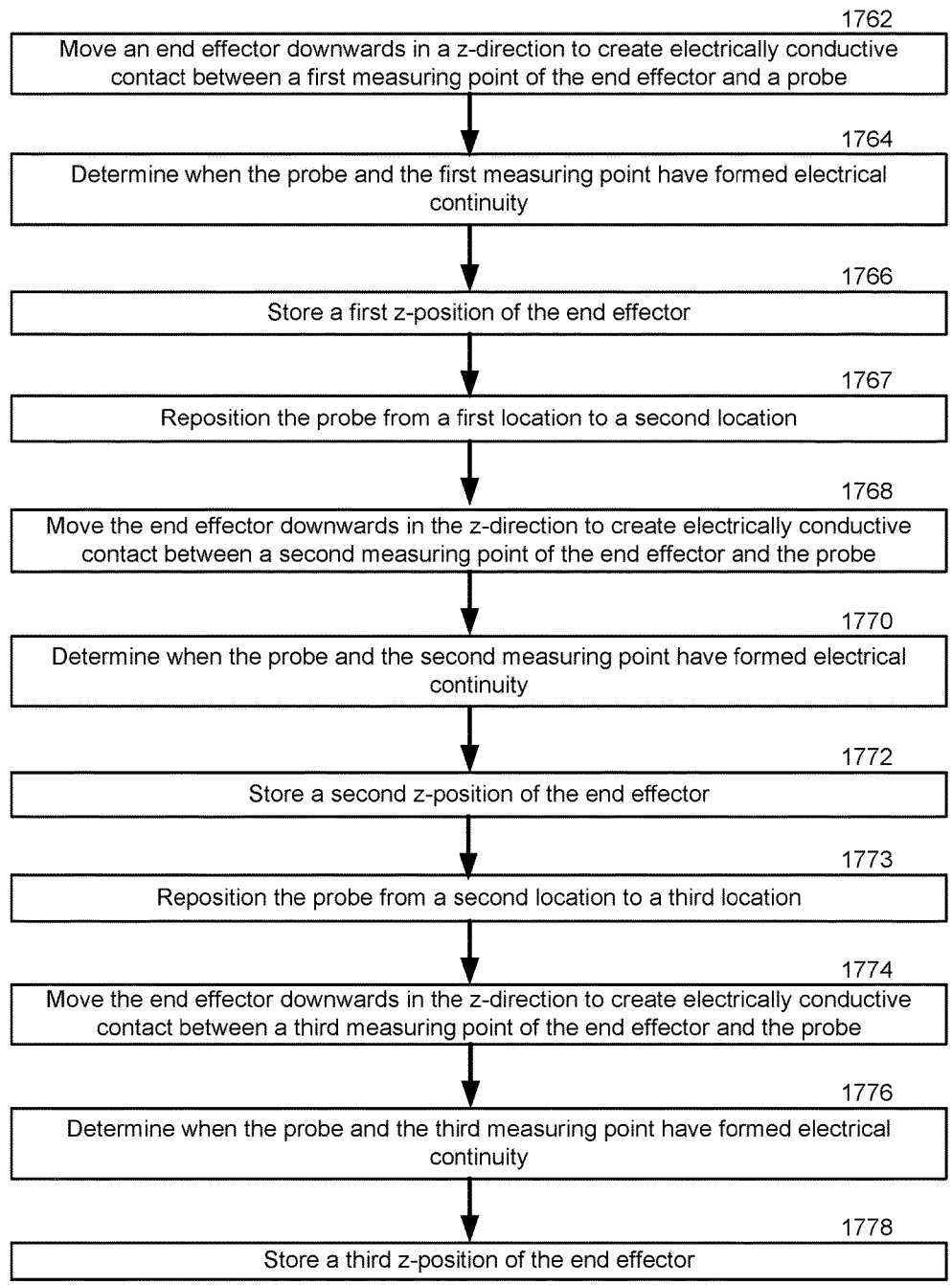
FIG. 17 depicts an example implementation of measuring the height of an end effector.

Some implementations of the first general embodiment that include movement of the probe between locations while the end effector moves in the vertical direction will now be discussed. FIG. 17 depicts an example implementation of measuring the height of an end effector. In some such implementations, the end effector may be moved into an initial position in the air lock, for example. The initial position of the end effector may enable the end effector to move only in a vertical direction, e.g., the z-direction, such that the probe may create electrically conductive contact between the probe and the different measuring locations of the end effector. In some implementations, the jig and probe are also be placed inside the air lock so that they are below the end effector, and the probe may be positioned into one or more of the locations that are set by the jig.

For instance, the probe may be located at the first location and the initial position of the end effector may enable the end effector to move downwards in the z-direction to create electrically conductive contact between the first measuring point of the end effector and the probe, as provided in block 1762. As discussed above, the probe and the end effector may be configured to create an electrically conductive path when they are in contact. A determination may be made, by the controller and/or an electrical continuity detector, when the probe and the first measuring point have formed electrical continuity, as stated in block 1764. Once that determination is made, in block 1766 the first z-position of the end effector may be store, as mentioned above, for example, by a controller or other device/memory; it may also be stored by a computer separate from the tool. The first z-position, i.e., vertical height or z-height, may be the vertical or z-direction position of the end effector when electrical continuity first occurs between the first measuring point and the probe during the movement of the end effector in the z-direction.

The probe may then be positioned in another location that may be set by the jig, such as the second location. For instance, in block 1767 the probe is repositioned from a first location to a second location. Prior to repositioning the probe, the end effector may be moved upwards in the z-direction such that there is no electrically conductive contact between the end effector and the probe. Again, the end effector may not move in a direction other than the z-direction. With the probe in the second location, in block 1768 the end effector may be moved downwards again in the z-direction in order to create electrically conductive contact between the second measuring point of the end effector and the probe. Blocks 1770 and 1772 are performed similarly to blocks 1764 and 1766, respectively, but are for the second measuring point and the second z-position. Prior to block 1774, the end effector again may move vertically upwards so that there is no electrically conductive contact between the end effector and the probe. The probe may be repositioned to a third location, as in block 1773, and blocks 1774, 1776, and 1778 may be performed similarly to blocks 1762, 1764, and 1768, respectively, but for the third location, third measuring point, and the third z-position. In some such implementations, each location, e.g., the first location and the second location, are different from all other locations.

Such an implementation may also be performed with more than three measuring points and three locations. For example, an implementation may be performed with ten measuring points of an end effector and ten locations for the jig, like depicted in FIG. 15.

The probe may be positioned at the different locations by a person, or by mechanical means, such as a probe connected to a jig that has motor and mechanical mechanisms that may move the probe in the x- and y-directions to each location.

The present inventors have determined that, as mentioned above, a user or person may implement the methods and techniques discussed herein. For example, a user may initially place the jig and probe into an air lock, and control the tool to position the end effector in a position for performing the aforementioned measurements. The user may also connect the continuity detector to the probe and to a ground, which may be a portion of the air lock or tool. In this example, the continuity detector may be a multimeter that includes a continuity detection mode. The user may then manually lower the end effector (e.g., using controls on the tool which using the movement mechanism of the tool to lower the end effector, such as with the press of a button to jog the end effector in the Z-direction) such that, as described above, electrically conductive contact occurs between the probe and the first measuring point of the end effector. At the moment electrically conductive contact occurs, an alert (e.g. an audible sound, visual light, or other indication) may be emitted by the electrical continuity detector so that the user may stop the downward vertical movement of the end effector. The user may then record the z-height measurement of the end effector into a computer program, such as on a user interface of the tool or on a computer, such as a Microsoft Excel spreadsheet. The user may then raise the end effector (e.g., using the controls of the tool) so that there is a gap between the probe and the end effector and no electrical contact is occurring between the two. The user may then physically reposition the probe from the first location to the second location, after which the measurement steps may be repeated by the user (e.g., lowering of the end effector, storing the z-height, raising the end effector, repositioning the probe). Therefore, in some such implementation, a user may be controlling and/or performing all of the blocks of FIG. 17.

The second general embodiment that includes movement of the end effector in an x- and/or y-direction between locations while the probe remains stationary will now be discussed. In some such embodiments, the probe may be located within the air lock, or other part of the tool, such that it remains stationary while measuring the height of the end effector is performed. The probe may be permanently installed in the tool, or it may be temporarily placed in a specific location in the tool.

In some such embodiments, the same general principle of creating electrically conductive contact between the probe and a measuring point of the end effector still applies, but here, the end effector, not the probe, is repositioned in order to create the electrically conductive contact between the probe and different measuring points of the end effector. Therefore, in such embodiments, the end effector moves in the x-, y-, z-, and/or theta directions so that the probe makes electrically conductive contact with the end effector at different measuring locations of the end effector. The controller, as discussed above, may contain control logic and/or instructions for moving the end effector between locations such that the probe may contact the different measuring points of the end effector.

Figure 18:
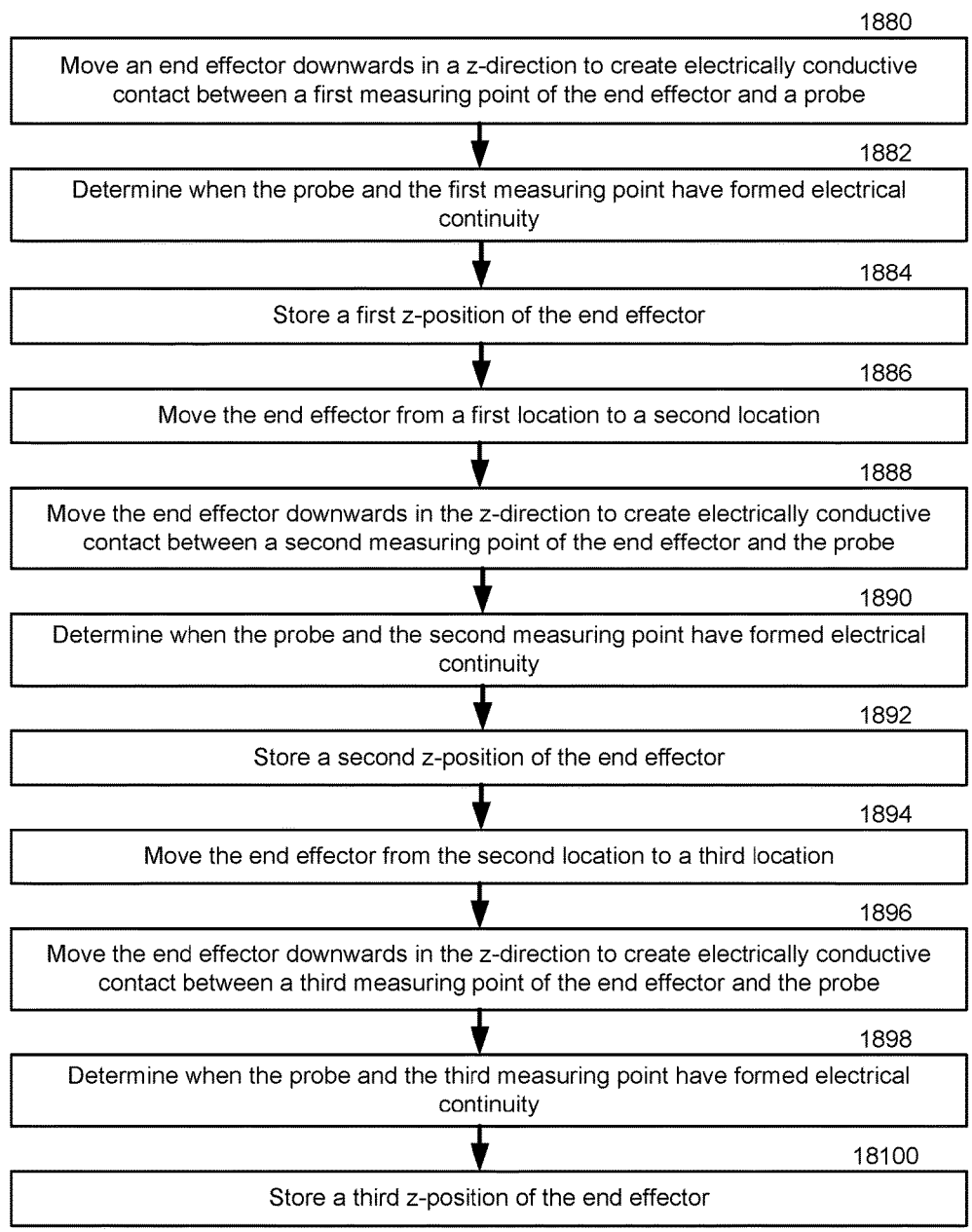
FIG. 18 depicts a flowchart of a sample implementation of the second general embodiment that includes movement of the end effector in an x- and/or y-direction between locations while the probe remains stationary.

For example, FIG. 18 depicts a flowchart of a sample implementation of the second general embodiment that includes movement of the end effector in an x- and/or y-direction between locations while the probe remains stationary. Many of the blocks depicted in FIG. 18 may be identical or similar to those described in FIG. 17. For instance, blocks 1880, 1882, and 1884 may be implemented identically to blocks 1762, 1764, and 1766, respectively, but the end effector, not the probe, is repositioned to the different locations. FIG. 18 includes additional blocks 1886 and 1894 which are not in FIG. 17. In block 1886, the end effector is moved from a first location to a second location which may be accomplished by moving the end effector in the x-, y-, and/or theta directions. Similarly, in block 1894, the end effector is moved from the second location to a third location, which again may be accomplished by moving the end effector in the x-, y-, and/or theta directions. In some such implementations, the first, second, and third locations are different from each other. The controller and/or other device, may be configured to perform at least some, and in some implementations all, of the blocks in FIG. 18.

Figure 19:
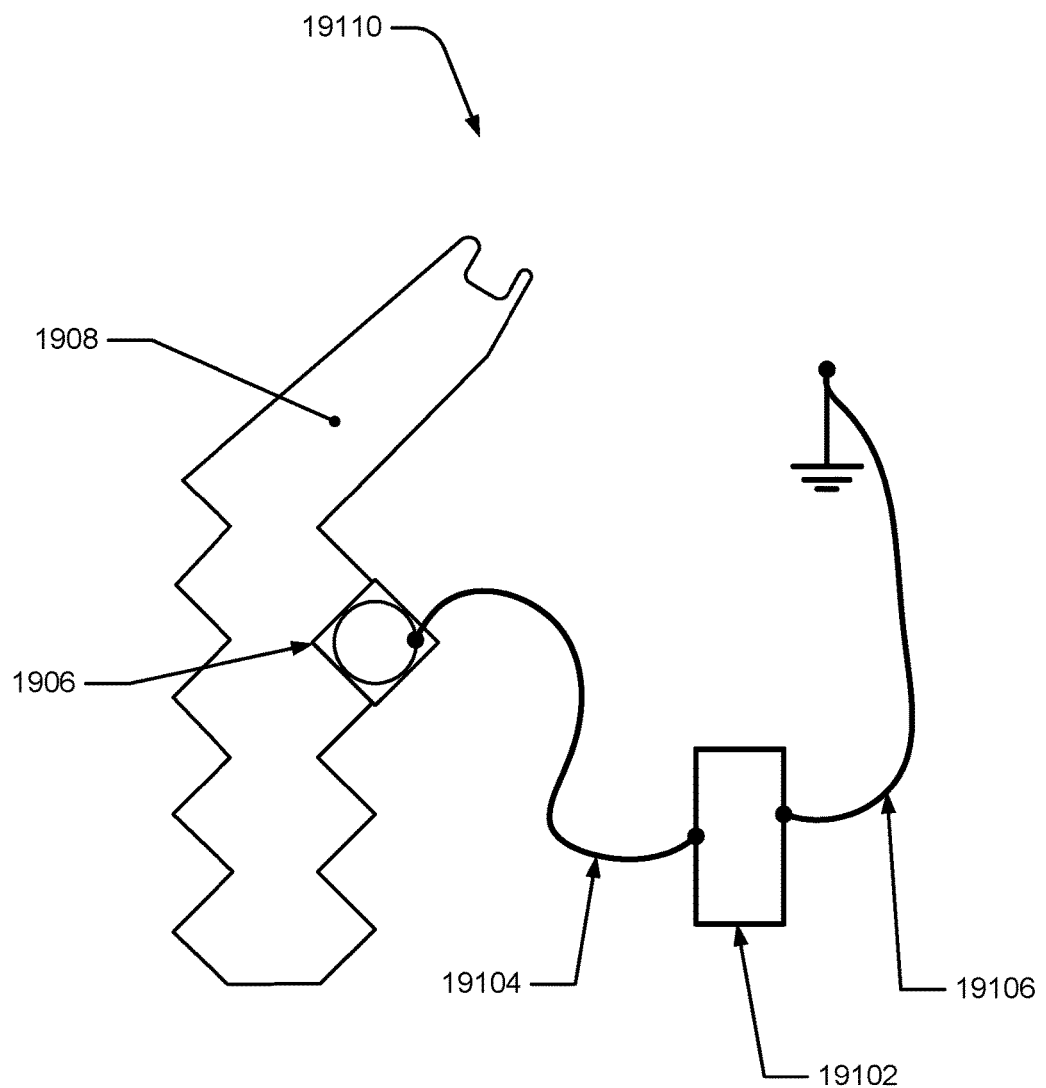
FIG. 19 depicts a first kit for measuring the height of an end effector.

Some embodiments of the present disclosure also include a kit for measuring the height and/or flatness of an end effector. FIG. 19 depicts a first kit for measuring the height of an end effector. In some such embodiments, the kit 19110 may include a first electrical cable 19104, a second electrical cable 19106, a probe 1906, a jig 1908 that may be configured to position the probe at at least a first location, a second location, and a third location, and an electrical continuity detector 19102. The kit may also include some or all of these items, and in some such embodiments, the kit may contain elements necessary to achieve electrical continuity between the end effector and the probe. The first cable 19104 may be configured to be electrically connected to the probe. Such electrical connection may be made using any known techniques in the art, including the electrical connection port, as discussed above in FIG. 8. This may include connecting an electrically connective lug or other bolt to the electrical connection port which is also electrically connected to the first cable. The second cable 19106 may be configured to electrically connect to a ground, as shown in FIG. 19. In some embodiments, the ground may be part of the semiconductor processing tool, including the air lock. The jig 1906, may be configured to locate the probe at at least three locations, and as depicted in FIG. 19, may be configured to locate the probe at ten locations, similar to the jig in FIG. 12. The electrical continuity detector 19102 may be configured to electrically connect with the first electrical cable and the second electrical cable, as shown, and configured to detect electrical continuity between the probe and the end effector when the probe and the end effector are in electrically conductive contact. The electrical continuity detector 19102 may be a multimeter or may be the controller, as discussed above.

Some embodiments of the present disclosure also include a system for measuring the height of an end effector. The system may include an end effector that may be configured to move in the x-, y-, z-, and/or theta directions, as stated above. The x-direction may be orthogonal to the y-direction, and the x- and y-directions may be perpendicular to the z-direction. The system may also include a probe, similar to that discussed herein, an electrical continuity detector, also as discussed herein, and a controller. The controller may be configured similarly to the controller already discussed above. In some such embodiments, the controller may be configured to move the end effector in the z-direction to create electrically conductive contact between the end effector and the probe, determine when the probe and the end effector have formed electrical continuity, and store a z-position of the end effector, wherein the second z-position of the end effector is a position of the end effector in the z-direction when electrical continuity first occurs between the end effector and the probe during the movement of the end effector in the z-direction. Such instructions may be similar to the embodiments and implementations discussed herein above, including the blocks in FIGS. 17 and 18.

In some embodiments, the system may be configured similar or identical to the first general embodiment that includes movement of the probe between locations while the end effector moves in the vertical direction, as discussed above, as well as to the second general embodiment that includes movement of the end effector in an x- and/or y-direction between locations while the probe remains stationary, as discussed hereinabove.

In some of the embodiments discussed herein, the end effector may be configured differently than those depicted in the Figures. For instance, an end effector may be configured into a "dagger" and/or "T" like shapes. Regardless, the techniques, embodiments, and implementations discussed herein apply to differently shaped end effectors.

In some of the embodiments discussed herein, the minimum number of measuring locations on the end effector may be three measuring locations. In some such embodiments, the measuring locations may be located substantially proximate to the wafer supports on the end effector.

There may also be some compliance, or "give", in the end effector and/or probe in some embodiments. For instance, the probe may be made of a solid metal, while the end effector may be a long, thin piece of metal that deforms under much less force than the probe. In some such instances, there may be compliance, e.g., deformation, of the end effector when it contacts the probe. Some compliance in either the probe and/or end effector may prevent unwanted damage and/or deformation to either piece of equipment. However, if too much compliance exists, then the accuracy of the measurements may be adversely affected.

The embodiments and implementations discussed herein may occur in numerous parts of the tool, including the air lock, load lock, or other parts. They may also be configured to occur in either a vacuum or non-vacuum environment.

The movement of the end effector in the vertical direction may occur in any useful increment for determining the end effector height and/or flatness. In some embodiments, this vertical movement of the end effector may be the shortest movement pulse achievable by the movement mechanism moving the end effector. In some embodiments, the vertical movement may be of different distances, such as larger distances farther above the probe and smaller distances closer to the probe. The movement may also be controlled by a user.

In some embodiments, the jig may be configured to be aligned with the end effector such that the locations on each side of the jig align with similarly-located points on each side of the end effector. For example, the jig may be configured to be placed in an air lock such that the probe may be positioned to contact measuring locations on the left side of the end effector as well as measuring locations on the right side that are in similar positions to each other on each side. For example, referring back to FIG. 15, the jig is configured to locate the probe at five locations, 1212 through 1220, so that the probe may contact measuring locations 732 through 740, respectively. The jig is also configured to place the probe on the right side of the end effector so that the probe may contact the measuring locations on the right side of the end effector, 742 through 750, which may be similarly-located and/or mirror locations of the left side measuring locations 732 through 740.

In some embodiments and/or implementations, the z-height measurements may be used to calculate and/or determine the flatness of the end effector. The height measurements may be used to determine flatness of an end effector by comparing such measurements against a linear fit of two or more points of the end effector or to use a plane fit of two or more points of the end effector. In some such embodiments using a liner fit, the two points may be two points closest to wafer support pads, or where two wafer support pads are located. The linear fit may also be offset by a specific amount, which may be based on, for instance, certain allowable deformation criteria or clearance threshold parameters. For instance, the linear fit may be vertically offset above the initial linear fit line in order to determine whether end effector measurements are within an allowable threshold of the end effector. The offset may be based on a number of factors, similar to the clearance amount described above, such that some deformation of the end effector may be allowable up to a specific amount. In one example, the offset may be about 0.02 inches above the linear fit line, which in turn means that the end effector measurements higher than 0.02 inches above the initial linear fit line may not be considered "flat". The linear fit offset may represent the approximate location of the wafer (the wafer may be assumed to not deflect and thus forms a line that extends between the wafer support pads).

Figure 20:
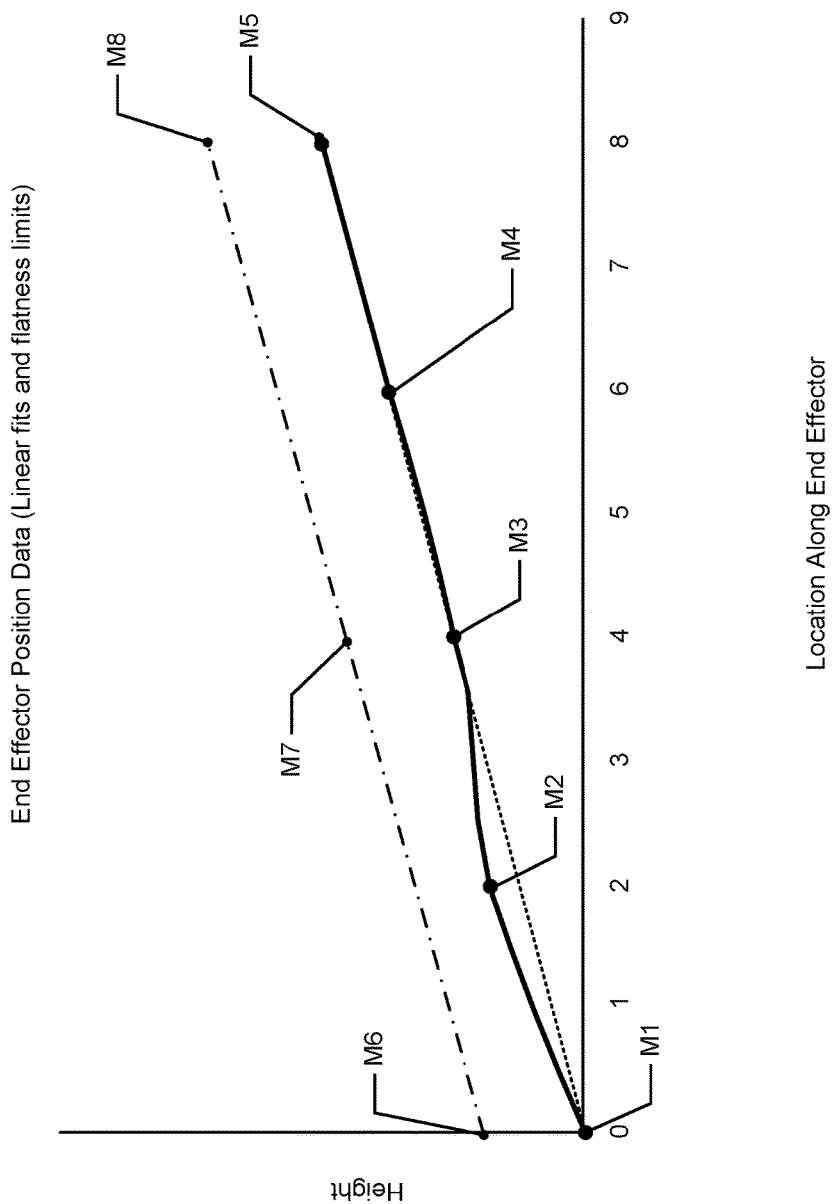
FIG. 20 depicts one sample implementation of determining flatness of an end effector.

FIG. 20 depicts one sample implementation of determining flatness of an end effector. The end effector position data is shown in FIG. 20 and includes z-positions for the end effector along the y-axis and the location along the end effector in the x-axis. The five plotted z-position measurements are M1, M2, M3, M4, and M5. Here, sample points M3 and M5 correspond to the location of the wafer support pads. An initial, original linear fit line can be seen as a dotted lined that extends from 0 (M1) to M5. The offset line, in a dashed-dotted line, is offset above the initial line begins at M6 and extends between M7 and M8. The five z-position measurements are below the offset line, which indicates that the end effector is within the allowable threshold, i.e., "flat".

Figure 21:
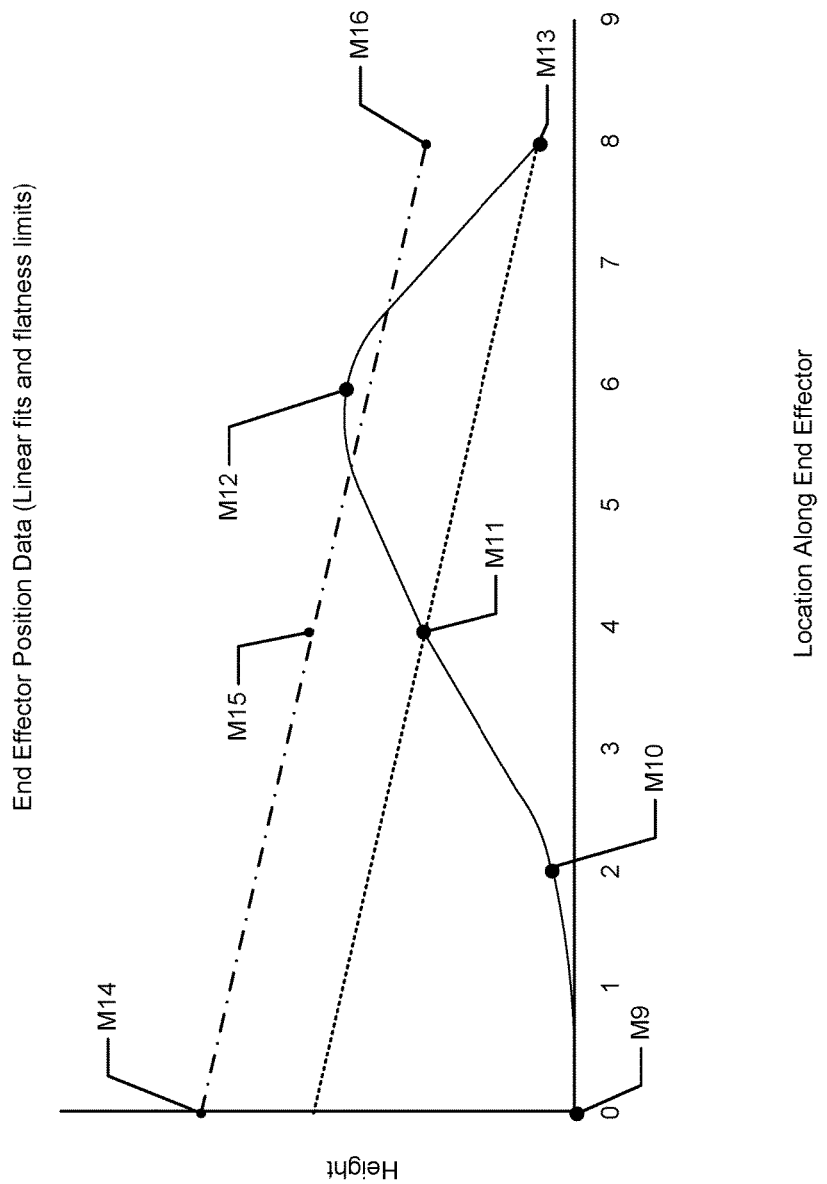
FIG. 21 depicts end effector position data for another end effector.

However, if one or more measurements are above a determined threshold, then the end effector may not be within the acceptable flatness parameters. FIG. 21 depicts end effector position data for another end effector. The axes and layout of FIG. 21 are similar to FIG. 20. As can be seen, the five plotted z-height measurements of the end effector are M9, M10, M11, M12, and M13. The initial linear fit line, the dashed line, extends between points M11 and M13, and the offset line, the dashed-dotted line, is offset above the initial linear fit line and extends between points M14, M15, and M16. The measurement height M12 is above this offset line, indicating that it falls outside the allowable height measurement for this end effector. Accordingly, this end effector is not adequately "flat".

Figure 22:
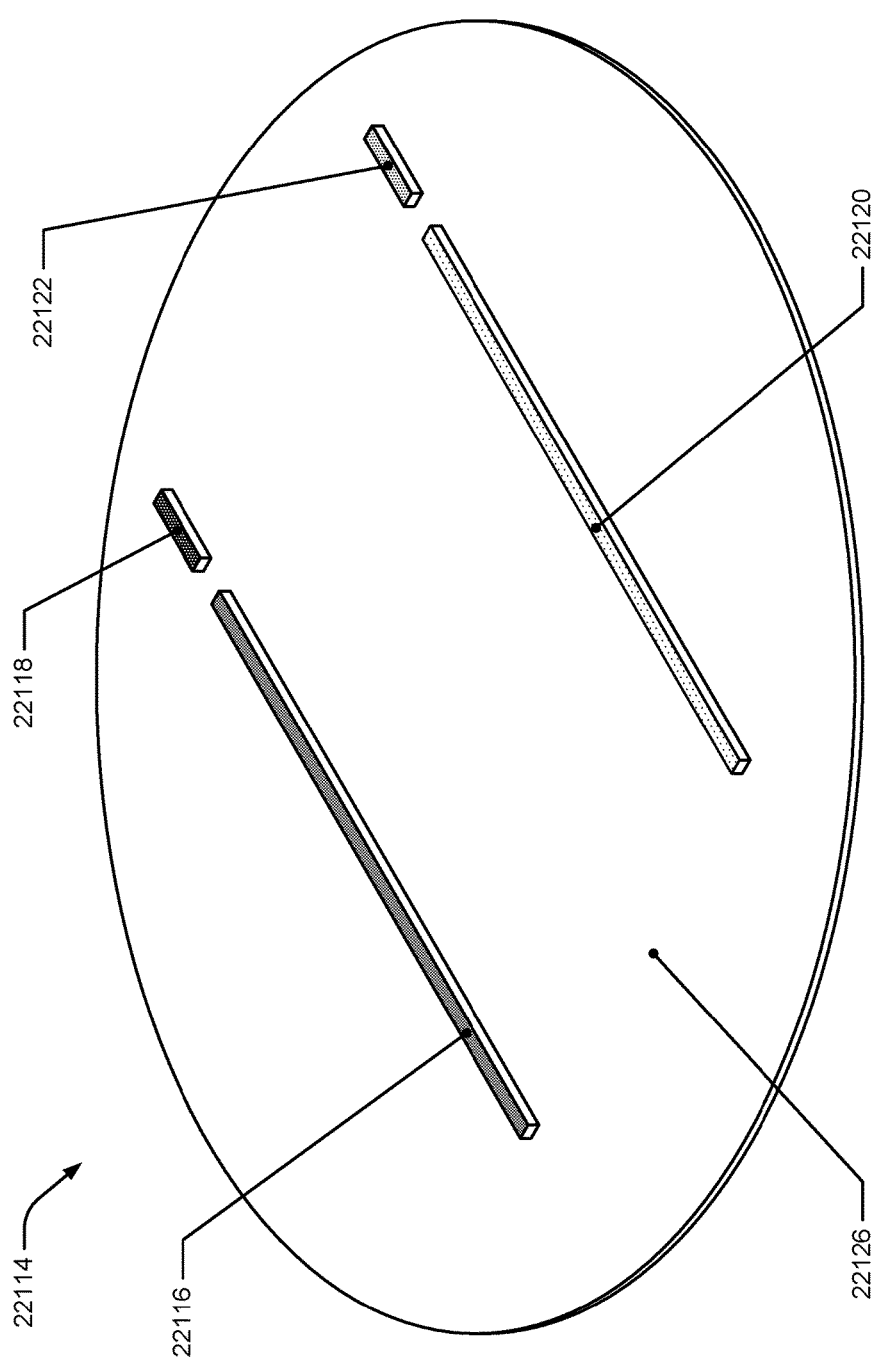
FIG. 22 depicts an isometric view of a first example plate.

Another embodiment of the present disclosure includes a technique for determining flatness of an end effector in a semiconductor processing tool using a plate that is placed on the end effector during flatness measurement operations. FIG. 22 depicts an isometric view of a first example plate. As can be seen, the plate 22114 is a circular plate that includes a first plate surface 22126, a first conductive surface 22116, a second conductive surface 22118, a third conductive surface 22120, and a fourth conductive surface 22122. The four conductive surfaces are placed on the first plate surface 22126 and can be seen with different shading. Each conductive surface may face away from the plate 22114 and may be offset from a first plate surface 22126, for instance as shown in FIG. 22, by a separation distance. The geometry of each conductive surface may be different than shown in FIG. 22, such as, a line, point, circle, square, or round. In some embodiments, the surface area of the conductive surface, or surfaces, of the plate may be configured to substantially match (e.g. within +/−10%) the surface area of the top surface over which the plate is placed. A conductive surface may be a conductive layer placed on a non-conductive material, or it may be a part of a larger conductive element or body.

In some embodiments, the weight and/or center of gravity of the plate may be the same as a wafer. In some other embodiments, the weight and/or center of gravity of the plate may be different than a wafer. In some such other embodiments, the weight and/or center of gravity of the plate may be adjusted or tuned by the addition or subtraction of weights, components, material, and the like. Such adjustments enable the weight and/or center of gravity of the plate to be tuned such that the plate may have a weight and/or center of gravity that is substantially equal to than a wafer. Here, "substantially equal" means within +/−10% of the given value. In some such embodiments, material may be removed or placed on and/or within the plate in order to modify the weight and/or center of gravity of the plate such that the plate, including all its parts such as the conductive surfaces, has a weight and center of gravity substantially equal to that of a wafer so that, for instance, when the plate is placed on the end effector, the end effector is caused to deform in a manner substantially similar to when a wafer is placed on the end effector.

Figure 23:
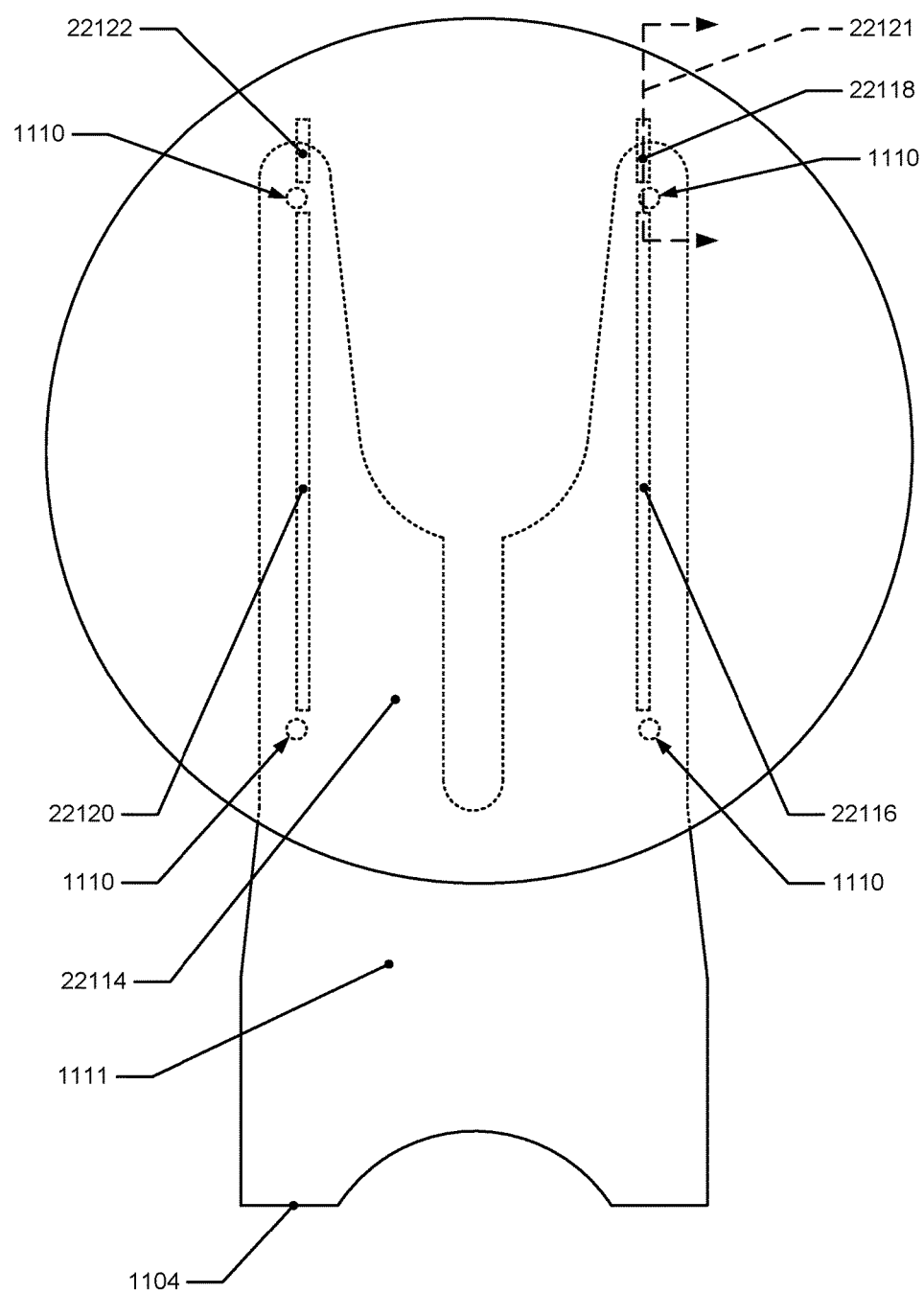
FIG. 23 depicts a plan view of the plate placed on the end effector during flatness measurement operations.

The plate 22114 may be placed on an end effector to cause at least the first conductive surface of the plate to face the top surface of the end effector. This placement may occur during flatness measurement operations. Referring back to FIG. 1, the end effector 1104 may also include a top surface, identified as 1111, which as depicted, is the surface on which the wafer support pads 1110 are located. FIG. 23 depicts a plan view of the plate placed on the end effector during flatness measurement operations. The features located on the underside of the plate 22114 (e.g., the conductive surfaces) and underneath the plate 22114 can be seen as dotted lines. Here in FIG. 23, the first plate surface (not identified) is facing the top surface 1111 of the end effector, i.e., facing into the page of the Figure, and is contacting the wafer support pads 1110 such that the plate 22114 is supported by the wafer support pads 1110.

In some embodiments, the plate may be made of an electrically conductive material. In some such embodiments, the wafer support pads of the end effector may be made of nonconductive material so that when the plate is placed on the end effector, an electrical path is not created between the plate and the end effector through the wafer support pad. In some other such embodiments, both the plate and the wafer support pads made be made of conductive material, but the plate may have a nonconductive layer or material where the wafer support pads contact the plate in order to prevent an electrical path from forming between the plate and the end effector through the wafer support pad. As described in greater detail below, the flatness of an end effector may be determined when the plate is placed on the end effector using electrical continuity between the conductive surface(s) of the plate and the end effector. In order for an effective determination of end effector flatness to be made, however, such a determination may require that there is otherwise no electrical continuity between the plate and the end effector through the wafer support pads.

In some other embodiments, the plate may be made of a nonconductive material, such as a polymer. In some such embodiments, the conductive surface(s) of the plate may be an electrically conductive coating or layer that is applied to the plate.

In FIG. 23, the first, second, third, and fourth conductive surfaces, 22116, 22118, 22120, and 22122, respectively, are facing into the page and facing the top surface 1111. "Face" in this context means that two surfaces are oriented towards each other such that a line extending from at least one point on one of the surfaces in a direction normal to that surface intersects with a point on the other surface.

Figure 24:
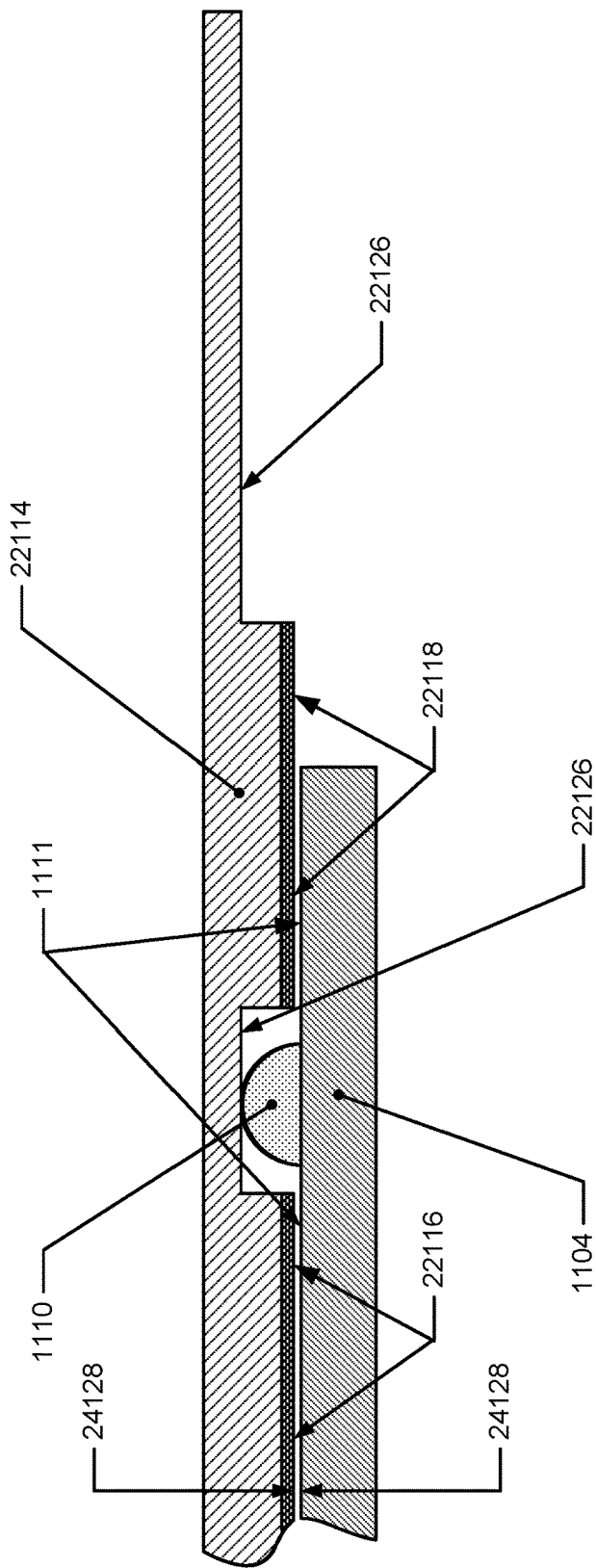
FIG. 24 depicts a magnified cross-sectional side view of an identified portion of the plate and the end effector of FIG. 23.

FIG. 24 depicts a magnified cross-sectional side view of an identified portion of the plate and the end effector of FIG. 23. In FIG. 23, the identified portion is labeled 23121 and as can be seen in FIG. 24, the plate 22114 is placed on the wafer support pad 1110 such that the first conductive surface 22116 is facing the top surface 1111 of the end effector 1104, the second conductive surface 22118 is facing the top surface 1111, and the first plate surface is also facing the top surface 1111. The conductive surfaces may be electrically conductive coatings or layers placed on the plate 22114.

The first conductive surface 22116 may be separated from the top surface 1111 by a first distance 24128 as identified in-between the two vertical arrows marked 24128. The first distance may refer to a separation distance between the conductive surface and the top surface when the end effector is in an undeflected state. When an end effector is in a deflected state, which may be caused by the weight of the plate, the distance between the conductive surface and the top surface of the end effector at various locations along the end effector may increase, decrease, or remain the same, depending on the manner of the end effector deflection and the locations of those particular positions. The first distance may be any suitable distance for flatness measurement operations as discussed below. In some embodiments, each conductive surface may be separated from the top surface by the same first distance when the end effector is in an undeflected state, while in some other embodiments, at least one conductive surface may be separated from the top surface by a different distance when the end effector is in an undeflected state.

The conductive surfaces may be configured such that they are located proximate to one or more wafer support pads when the plate is located on the end effector. Referring back to FIG. 23, the first conductive surface 22116 is seen proximate to and in-between two wafer support pads 1110, the second conductive surface 22118 is seen proximate to only one wafer support pad 1110, the third conductive surface 22120 is seen proximate to and in-between two other wafer support pads 1110, and the fourth conductive surface 22122 is seen proximate to one wafer support pad 1110. FIG. 24 also depicts the first conductive surface 22116 and the second conductive surface 22118 proximate to the wafer support pad 1110.

The conductive surfaces of the plate 22114 and the top surface 1111 of the end effector 1104 may be configured to create an electrically conductive path when they are in contact, as may occur when the plate 22114 is placed on the end effector 1104 and the end effector 1104 deflects due to the weight of the disk 22114. Such electrical path and/or configuration may be similar to the discussion above with regard to the electrical path between the probe and the end effector. For instance, the end effector 1104 may be made of electrically conductive material such that at least the top surface 1111 is electrically conductive, the top surface 1111 may be electrically connected to an electrical ground, and the first conductive surface 22116 of the plate 22114 may be electrically connected to an electrical continuity detector such that when the top surface 1111 contacts the first conductive surface 22116, electrically continuity is created between the two surfaces. In another example, as mentioned above, the end effector may be coated with a non-conductive coating but, at one or more sections of the top surface of the end effector, it may be configured to be electrically conductive, e.g., the coating may be removed or otherwise absent, such that when the one or more sections is in contact with a first conductive surface of the plate, an electrically conductive path is established.

Figure 25:
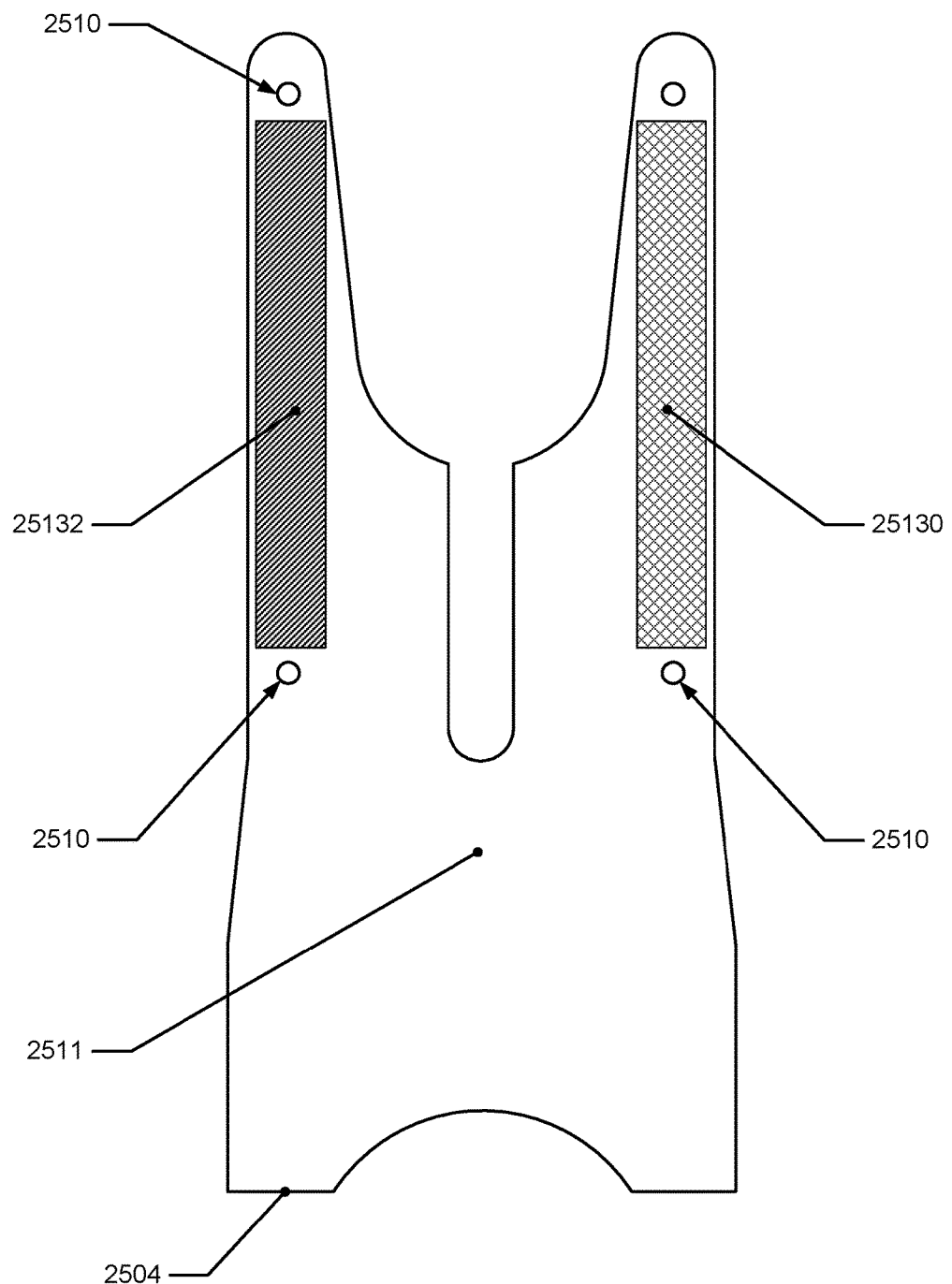
FIG. 25 depicts a plan view of an end effector.

In some embodiments, substantially all of the top surface 1111 of the end effector may be electrically conductive material. As used herein, "substantially" means at least 80% of the top surface 1111. However, in some embodiments, the top surface 1111 of the end effector may have two or more sections in which each section is an electrically conductive surface. In some such embodiments, each section may be electrically isolated from at least one other section. FIG. 25 depicts a plan view of an end effector. As can be seen, the top surface 2511 of the end effector 2504 includes four wafer support pads 2510, as well as a first section 25130 and a second section 25132. Each section may be made of electrically conductive material and may be electrically isolated from the other sections.

Each section of the top surface may also be configured to create an electrically conductive path when a section is in contact with a conductive surface of the plate. For example, the first conductive surface 22116 and the first section 25130 may be configured to create an electrically conductive path when they are in contact, while the second conductive surface 22118 and the second section 25132 may be configured to create a separate electrically conductive path when they are in contact. In some embodiments, each section may be an electrically conductive surface that may create an electrically conductive path when in contact with a conductive surface of the plate. In some embodiments, the first and second section may all be electrically connected to each other.

Figure 26:
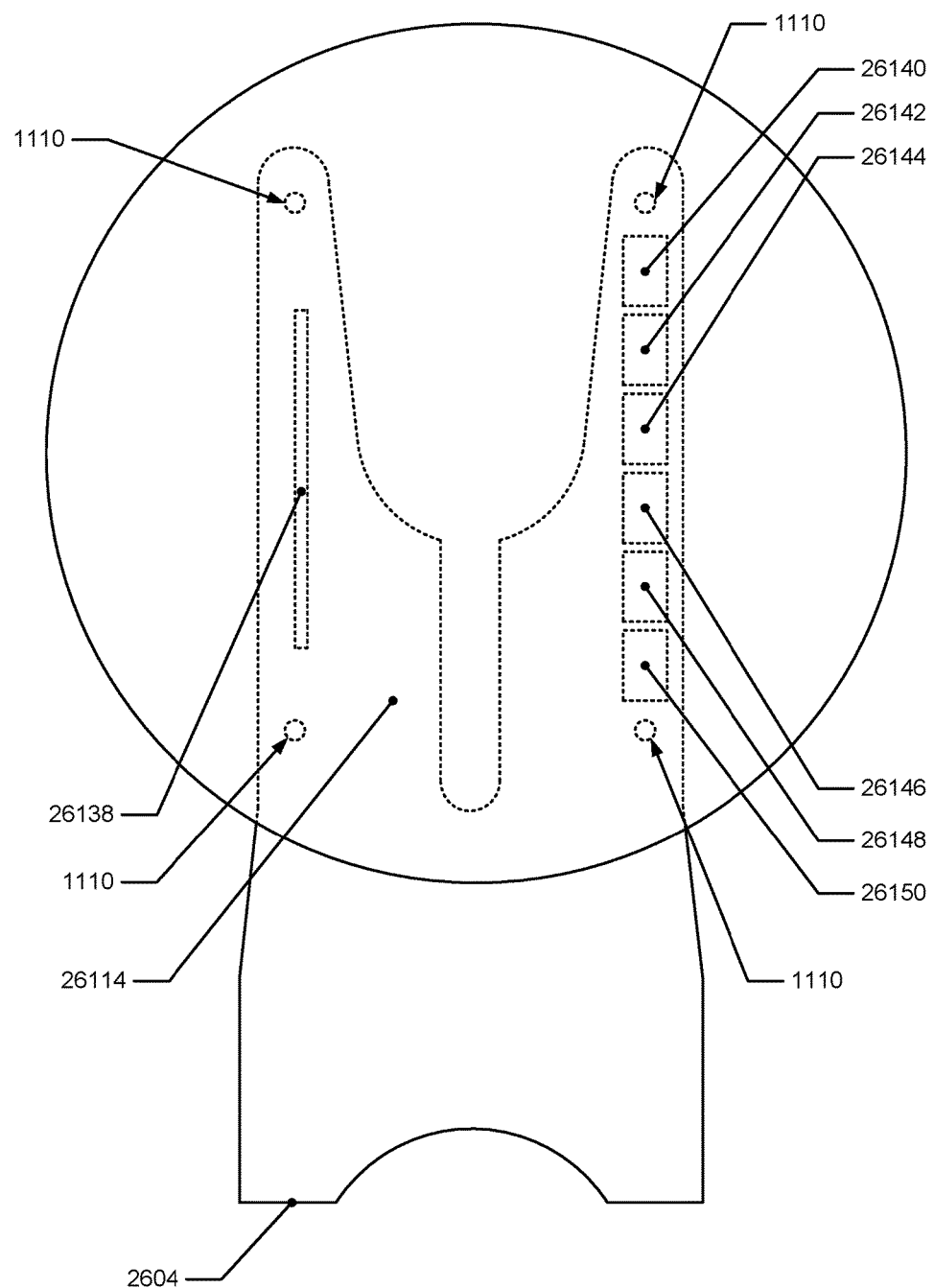
FIG. 26 depicts a plan view of a plate placed on the end effector during flatness measurement operations similar to FIG. 23.

In some embodiments, the conductive surfaces may be configured and located on the plate differently than depicted in FIGS. 22 and 23. For instance, one or more conductive surfaces may be shorter than the conductive surfaces shown in FIGS. 22 and 23, such as 22120, and one or more conductive surfaces may not be located proximate to a wafer support pad when the plate is placed on the end effector during flatness measuring operations. Some examples of such configurations are shown in FIG. 26 which depicts a plan view of a plate placed on the end effector during flatness measurement operations similar to FIG. 23. Here, another example plate 26114 has been placed on end effector 2604 during flatness measuring operations. Like with FIG. 23, the features located on the underside of the plate 26114 (e.g., the conductive surfaces) and underneath the plate 26114 can be seen as dotted lines. On the left side of the Figure, plate 26114 includes a conductive surface 26138 that is shorter in length than conductive surface 22120 in FIG. 23 and located on plate 26114 such that it is not proximate to the wafer support pads 1110.

On the right side of FIG. 26, plate 26114 includes six conductive surfaces that are spaced between two wafer support pads 1110, 26140, 26142, 26144, 26146, 26148, and 26150, respectively. As can be seen, conductive surfaces 26140 and 26150 are located on the plate 26114 such that when plate 26114 is placed on the end effector 2604 during flatness measurement operations, these surfaces are proximate to wafer support pads 1110. Conductive surfaces 26142, 26144, 26146, and 26148 are equally-spaced on plate 26114 in-between conductive surfaces 26140 and 26150.

Similar to the first and second sections of the end effector discussed above, plate 26114 may also be configured such that each conductive surface 26140, 26142, 26144, 26146, 26148, and 26150, respectively, may create a separate electrically conductive path when one of the conductive surfaces is in contact with the top surface of the end effector. In some such configurations, each conductive surface may be electrically isolated from the other conductive surfaces. For instance, if only conductive surface 26142 is in contact with the top surface of the end effector 2604, then electrical continuity may be created only between conductive surface 26142 and the top surface of the end effector. This plate configuration, e.g. two or more electrically-isolated conductive surfaces arranged over a portion of the end effector, may allow for the determination of the location or region the end effector that has contacted the plate and thus provide insight as to where the end effector may be deformed the most. For example, electrical continuity between the top surface of the end effector and conductive surface 26138 (on the left side of FIG. 26) may indicate that at least one portion of the end effector 2604 is contacting the plate 26114, but no further information may be obtained as to where along the conductive surface 26138 the contact is made. On the other hand, the use and arrangement of multiple conductive surfaces 26140, 26142, 26144, 26146, 26148, and 26150, respectively, enables a more accurate determination of where and in how many locations contact has occurred between the end effector 2604 and the plate 26114.

In some embodiments, the plate may be configured such that at least a section of the first plate surface is a conductive area. Referring back to FIG. 22, the first plate surface 22126 may be a planar, exterior surface of plate 22114. In some such embodiments, there may be no conductive surfaces that are offset from the first plate surface (unlike what is depicted in FIG. 22, for instance), but rather the first plate surface is a continuous surface that is the conductive surface used for measuring flatness. In some such embodiments, substantially all (e.g., at least 90%) of the first plate surface may be conductive. In some other such embodiments, the first plate surface may be conductive and may also include conductive surfaces that are offset from the first plate surface, like those shown in FIG. 22, to enable flatness detection using all of the conductive surfaces of the plate. In some such embodiments, one or more portions of the top surface of the end effector may also be conductive, as discussed above, such that electrical continuity is created when the top surface and the conductive section(s) of the first plate surface are in contact with each other.

Figure 27:
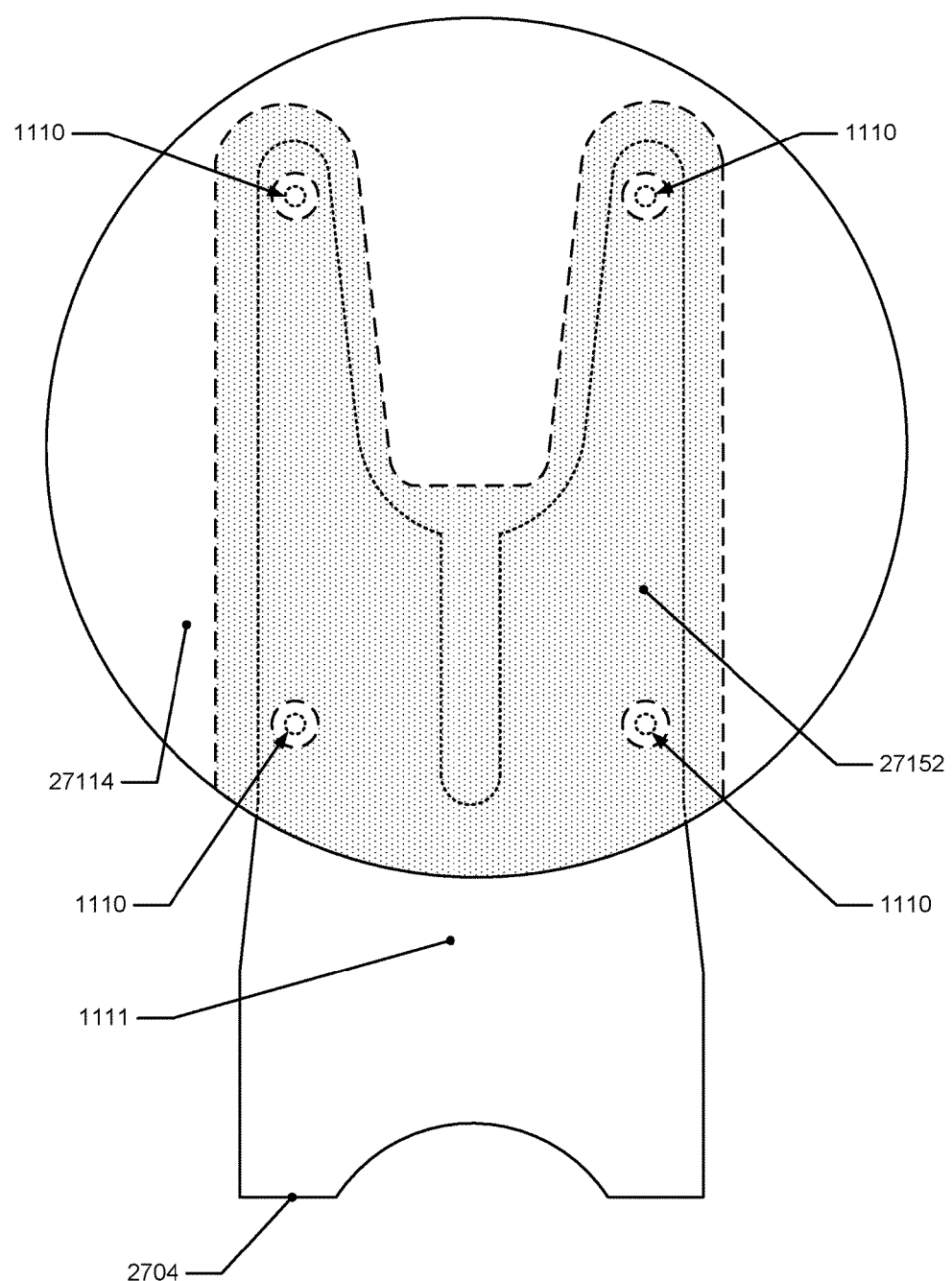
FIG. 27 depicts a plan view of a plate placed on the end effector during some flatness measurement operations.

In some embodiments, only a particular area of the first plate surface may be conductive. This particular conductive area may be a coating on the plate or may be a material of the plate itself. For instance, a first conductive area of the first plate surface may be shaped similar to, but larger than, the surface area of the top surface of the end effector over which the plate is located during flatness measurement. For example, FIG. 27 depicts a plan view of a plate placed on the end effector during flatness measurement operations similar to FIGS. 23 and 26. As can be seen, plate 27114 in FIG. 27 is placed on the end effector 2704 for flatness measurement operations and includes a conductive area 27152, identified with shading and dashed lines, that is a portion of the first plate surface (not identified) and that is facing the top surface 1111 of the end effector 2704, i.e., facing into the page. The conductive area 27152 is shaped similar to and larger than the surface area of the top surface 1111 of the end effector 2704 over which the plate 27114 has been placed. In some embodiments, the shape of the conductive area may be different than that shown in FIG. 27. In some embodiments, such as that shown in FIG. 27, the conductive area 27152 may include nonconductive areas over the wafer support pads 1110 in order to prevent an electrical path to occur between the end effector 2704 and the plate 27114 through the wafer support pad 1110.

Similar to the discussion herein above, the conductive area 27152 and the top surface 1111 of the end effector 2704 may be configured to create an electrical path when they are in contact with each other. Furthermore, for example, the conductive area 27152 may be electrically connected to a continuity detector and one or more portions of the top surface 1111 of the end effector 2704 may be conductive and also electrically connected to the continuity detector and/or a ground such that the continuity detector can detect when electrical continuity occurs between the conductive area 27152 and the conductive portions of the end effector 2704.

It should be noted that the Figures presented herein are example configurations and that a plate may include more or less surfaces, and which may be configured differently, than shown and discussed.

One example technique for using the above-described plate to determine flatness of an end effector in a semiconductor processing tool will now be discussed. Flowchart 28 depicts an example technique for using a plate such as that described above to determine flatness of an end effector. In block 28134, the plate is placed on the end effector and such placement may cause a first conductive surface, a second conductive surface, a third conductive surface, and a fourth conductive surface of the plate to face a top surface of the end effector like discussed above with regard to plate 22114, including the first conductive surface 22116, the second conductive 22118, the third conductive surface 22120, and the fourth conductive surface 22122. The plate may be placed on the end effector by a user and/or the end effector may pick up the plate either automatically or by manual user control of the end effector. In some such techniques, a single placement, of the plate onto the end effector may cause all four conductive surfaces to face the top surface. The technique described herein is an example implementation and such a technique may be used for a plate that may include more or less conductive surfaces.

During block 28134, the first conductive surface, the second conductive surface, the third conductive surface, and the fourth conductive surface may each be configured to create an electrically conductive path with the top surface of the end effector when a conductive surface is in contact with the top surface of the end effector, like discussed above with regard to plate 22114. Also in block 28134, the first conductive surface, the second conductive surface, the third conductive surface, and the fourth conductive surface may be configured to be separated from the top surface of the end effector by a first distance, as also discussed above with regard to plate 22114.

In block 28136, a force is applied on the end effector in a downwards z-direction, as discussed hereinabove. In some embodiments and/or implementations as discussed before, the force may be applied in a substantially equal manner to a downwards z-direction force caused by a wafer that is placed on the end effector, which may include, among other things, a substantially equal weight and center of gravity as the wafer. In some implementations, the downward force may be applied in a manner that is greater than that caused by a wafer. As mentioned above, this downward force may be adjusted by the addition or subtraction of weight and/or other items on the plate and/or may be achieved by other items located on the end effector, such as weights placed directly on the end effector.

Figure 28:
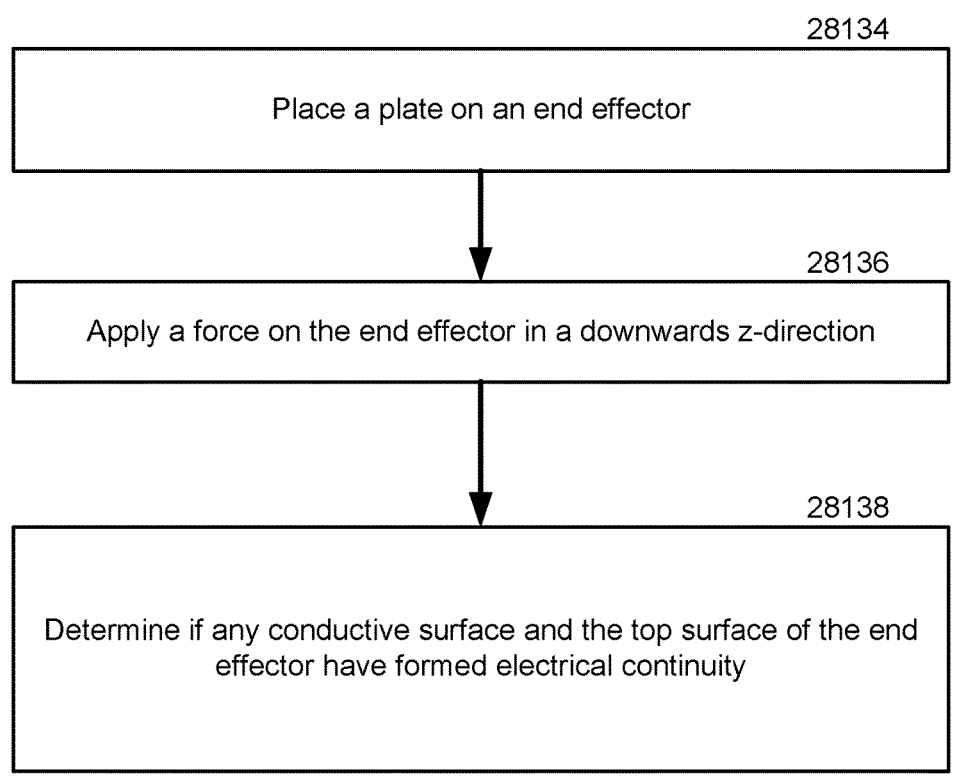

In some implementations, one or more determinations may be made of whether a conductive surface of a plate, similar or identical to plate 22114, and the top surface of the end effector have formed electrical continuity. As can be seen in FIG. 28, in block 28138 after block 28136 a determination is made as to whether any conductive surface and the top surface have formed electrical continuity. In block 28138, a determination may be made if the first conductive surface and the top surface of the end effector have formed electrical continuity, if the second conductive surface and the top surface of the end effector have formed electrical continuity, if the third conductive surface and the top surface of the end effector have formed electrical continuity, and if the fourth conductive surface and the top surface of the end effector have formed electrical continuity.

The determination of electrical continuity may be performed, as discussed above, by the use of an electrical continuity detector and such discussions and/or configurations are incorporated herein. For instance, the determination of electrical continuity between the first conductive surface and the top surface may be made by a continuity detector, such as a multimeter or controller, which may be electrically connected to the first conductive surface and to a ground (the ground may be the same ground to which the end effector is electrically connected).

In some implementations, the determination of block 28138 may include more than one determination, for example as discussed above with regard to FIG. 26. For instance, an electrical continuity detector electrically connected to each of the four conductive surfaces may be configured to make four separate determinations as to whether electrical continuity has occurred between each of the four conductive surfaces and the top surface. In such an implementation, if only the first conductive surface and the top surface have formed electrical continuity, then the electrical continuity detector may be able to determine that this electrical continuity occurred between the top surface and the first conductive surface, as opposed to the other three conductive surfaces, e.g., it may be able to differentiate which conducive surface is in contact with the top surface.

In some other implementations, the determination of block 28138 may be a single determination. In some such implementations, an electrical continuity detector may be electrically connected to all four conductive surfaces and the top surface such that if electrical continuity is formed between one or more conductive surfaces and the top surface, then the electrical continuity detector indicates the existence of electrical continuity without specifying, e.g. differentiating between, which conductive surface or surfaces formed electrical continuity with the top surface.

Selecting the first distance may also include the consideration of factors discussed herein, including, for instance those described above with regard to FIGS. 4, 5, and 6, as well as determining flatness in another embodiment like discussed with regard to FIGS. 20 and 21. For example, a minimum first distance, e.g. separation distance, may be selected such that any deflection of the end effector at or past that distance towards the plate may be considered undesirable and not "flat". Referring back to FIG. 21, the minimum separation distance may be the offset dashed-dotted line and any deflection of the end effector at or past that line, like point M12, indicates that the end effector falls outside the allowable height measurement for this end effector and the end effector is not adequately "flat". Conversely, any deflection of the end effector below this first distance may be considered adequately "flat". The different distances may be selected based on, among other things, how much deflection is desired or acceptable for a particular end effector.

In some implementations, the determination or determinations of continuity may be an indicator of end effector flatness. As discussed above, a threshold or tolerance of allowable end effector deflection and/or non-flatness may be based on numerous factors and criteria, and may be set at a desired value. In such implementations, the first distance separating the conductive surfaces of plate and the top surface of the end effector may be selected based upon a chosen threshold flatness tolerance such that when any portion of the end effector contacts a conductive surface of the plate and forms electrical continuity, that continuity indicates at least one portion of the end effector is at and/or past the chosen threshold flatness value, and may not be considered "flat".

Another embodiment of the present disclosure is a kit that includes a first a first electrical cable, a second electrical cable, a plate which includes a first conductive surface that is configured to face a top surface of the end effector when the plate is placed on the end effector, and an electrical continuity detector. The first cable may be configured to be electrically connected to the first conductive surface, the second cable may be configured to be electrically connected to a ground, the electrical continuity detector may be configured to electrically connect with the first electrical cable and the second electrical cable, and the electrical continuity detector may be configured to detect electrical continuity between the first conductive surface and the top surface of the end effector when the first conductive surface and the first section are in electrically conductive contact.

It should be noted that all elements and features of the kit may include all of the features and limitations, and may be configured, as discussed and shown herein above with respect to any other similarly named and/or described elements such as plates, end effectors, and/or continuity detectors, and such discussions and Figures are herein incorporated and applied by reference to such items.

Unless the context of this disclosure clearly requires otherwise, throughout the description and the embodiments, the words "comprise," "comprising," and the like are to be construed in an inclusive sense as opposed to an exclusive or exhaustive sense; that is to say, in a sense of "including, but not limited to." Words using the singular or plural number also generally include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list, and any combination of the items in the list. The term "implementation" refers to implementations of techniques and methods described herein, as well as to physical objects that embody the structures and/or incorporate the techniques and/or methods described herein. Unless otherwise specified, the term "sub-

The invention claimed is:

1. A system for measuring flatness of an end effector in a semiconductor processing tool, the system comprising:
    an end effector that is at least partially electrically conductive and is configured to move in a z-direction, an x-direction, and a y-direction, wherein the z-direction is in the vertical direction, the x-direction is orthogonal to the y-direction, and the x-direction and the y-direction are perpendicular to the z-direction;
    a probe;
    an electrical continuity detector configured to detect electrical continuity between the probe and the end effector when the probe and the end effector are in electrically conductive contact; and
    a controller configured to:
move the end effector in the z-direction to cause electrically conductive contact between the end effector and the probe.

2. The system of claim 1, wherein the controller is further configured to store a z-position of the end effector, wherein the second z-position of the end effector is a position of the end effector in the z-direction when electrical continuity first occurs between the end effector and the probe during the movement of the end effector in the z-direction.

3. The system of claim 1, wherein the electrical continuity detector is a multimeter.

4. The system of claim 3, wherein the controller is further configured to determine when the probe and the end effector have formed electrical continuity.

5. The system of claim 1, wherein:
    the probe is configured to be located at a first location, a second location, and a third location in the semiconductor processing tool, and
    the controller is further configured to:
        move the end effector downwards in a z-direction to create electrically conductive contact between the end effector and the probe when the probe is located at the first location, the second location, and the third location.

6. The system of claim 5, wherein the electrical continuity detector is further configured to determine when the probe and the end effector have formed electrical continuity when the probe is located at the first location, the second location, and the third location.

7. The system of claim 5, wherein the controller is further configured to determine when the probe and the end effector have formed electrical continuity when the probe is located at the first location, the second location, and the third location.

8. The system of claim 5, wherein the controller is further configured to:
    store a first z-position of the end effector, wherein the first z-position of the end effector is a position of the end effector in the z-direction when electrical continuity first occurs between the first measuring point and the probe during the movement of the end effector in the z-direction,
    store a second z-position of the end effector, wherein the second z-position of the end effector is a position of the end effector in the z-direction when electrical continuity first occurs between the second measuring point and the probe during the movement of the end effector in the z-direction, and
    store a third z-position of the end effector, wherein the third z-position of the end effector is a position of the end effector in the z-direction when electrical continuity first occurs between the third measuring point and the probe during the movement of the end effector in the z-direction.

9. The system of claim 5, further comprising a jig, wherein the jig is configured to be placed in a portion of the semiconductor processing tool in which an end effector can be located and is configured to position the gauge at a first location, a second location, and a third location.

10. The system of claim 9, wherein the jig is further configured to position the probe at one or more additional locations.

11. The system of claim 10, wherein the jig is further configured to position the probe at a fourth location, a fifth location, a sixth location, a seventh location, and an eighth location.

12. The system of claim 11, wherein the jig is further configured to position the probe at a ninth location and a tenth location.

13. The system of claim 1, wherein:
    the controller further comprises an input/output port, and
    the electrical continuity detector is a sensor that is electrically connected to the input/output port of the controller.

14. The system of claim 1, wherein:
    the end effector is further configured to move in an x-direction and a y-direction, wherein the x-direction is orthogonal to the y-direction, and wherein the x-direction and the y-direction are perpendicular to the z-direction, and
    the controller is further configured to:
        move the end effector to a first position, a second position, and a third location,
        move the end effector downwards in the z-direction to create electrically conductive contact between the end effector and the probe when the end effector is located at the first location, the second location, and the third location.

15. The system of claim 14, wherein the electrical continuity detector is further configured to determine when the probe and the end effector have formed electrical continuity when the probe is located at the first location, the second location, and the third location.

16. The system of claim 14, wherein the controller is further configured to determine when the probe and the end effector have formed electrical continuity when the probe is located at the first location, the second location, and the third location.

17. The system of claim 14, wherein the controller is further configured to
    store a first z-position of the end effector, wherein the first z-position of the end effector is a position of the end effector in the z-direction when electrical continuity first occurs between the first measuring point and the probe during the movement of the end effector in the z-direction,
    store a second z-position of the end effector, wherein the second z-position of the end effector is a position of the end effector in the z-direction when electrical continuity first occurs between the second measuring point and the probe during the movement of the end effector in the z-direction, and
    store a third z-position of the end effector, wherein the third z-position of the end effector is a position of the end effector in the z-direction when electrical continuity first occurs between the third measuring point and the probe during the movement of the end effector in the z-direction.

18. The system of claim 1, further comprising:
a first electrical cable; and
a second electrical cable, wherein:
   the first cable is configured to be electrically connected to the probe,
   the second cable is configured to be electrically connected to a ground, and
   the electrical continuity detector is configured to electrically connect with the first electrical cable and the second electrical cable.

* * * * *